United States Patent [19]
Fasulo, II et al.

[11] Patent Number: 5,742,639
[45] Date of Patent: Apr. 21, 1998

[54] MOBILE TERMINAL APPARATUS AND METHOD FOR A SATELLITE COMMUNICATION SYSTEM

[75] Inventors: Albert J. Fasulo, II, Ellicott City; Denise M. Cammarata, Owings Mills; Keith W. Janson, Ellicott City; Samuel S. Anderson, Glen Burnie; Raymond R. Cooper, Baltimore; Roy Stehlik, Columbia, all of Md.

[73] Assignee: Westinghouse Electric Corporation, Pittsburgh, Pa.

[21] Appl. No.: 322,858

[22] Filed: Oct. 13, 1994

Related U.S. Application Data

[63] Continuation-in-part of Ser. No. 242,400, May 13, 1994, abandoned.

[51] Int. Cl.$^6$ .................................................. H04B 1/38
[52] U.S. Cl. ..................... 375/219; 375/222; 375/324; 332/103; 455/73; 455/12
[58] Field of Search .................................... 375/219, 220, 375/222, 279, 324, 340; 332/103; 455/73, 12

[56] References Cited

U.S. PATENT DOCUMENTS

| | | | |
|---|---|---|---|
| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,879,728 | 11/1989 | Tarallo | 375/80 |
| 5,172,070 | 12/1992 | Hiraiwa et al. | 329/304 |
| 5,179,360 | 1/1993 | Suzuki | 332/103 |
| 5,289,464 | 2/1994 | Wang | 370/69.1 |
| 5,438,595 | 8/1995 | Cheng et al. | 375/340 |
| 5,479,480 | 12/1995 | Scott | 379/59 |

OTHER PUBLICATIONS

Connelly, "Design of the Westinghouse Series 1000 Mobile Phone," IEEE, pp. 347–350, May 18, 1993.

Connelly, "The Westinghouse Series 1000 Mobile Phone: Technology and Applications," IEEE, pp. 375–379, May 18, 1993.

Primary Examiner—Wellington Chin
Assistant Examiner—Congvan Tran

[57] ABSTRACT

A mobile terminal apparatus for satellite communication of voice data, facsimile and computer information, which consists of an RF transceiver section, an optional cellular board, and a processor board. The processor board has two digital signal processors and a multi-task control processor for controlling the operation of the signal processor.

8 Claims, 12 Drawing Sheets

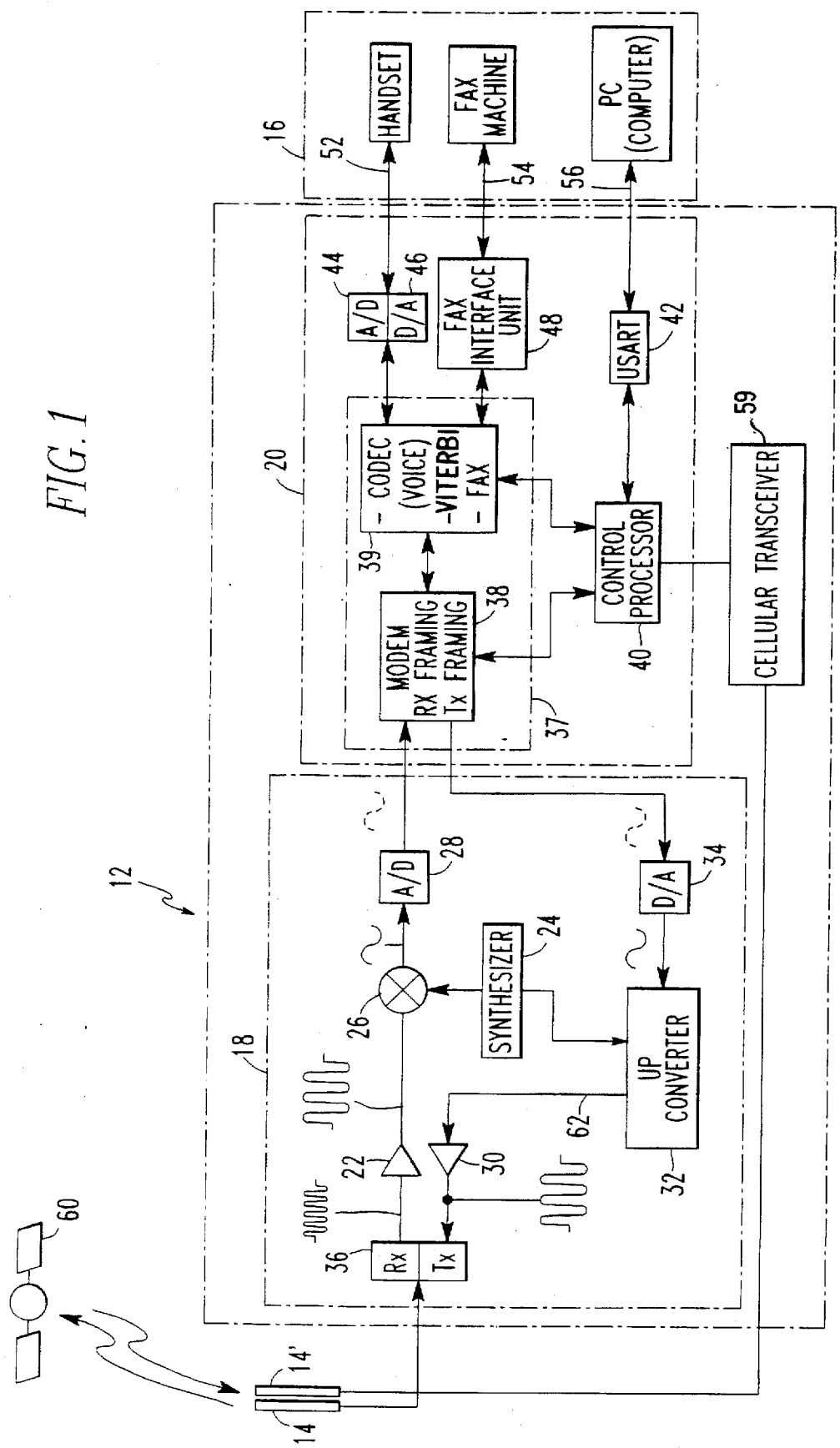

FIG. 4D

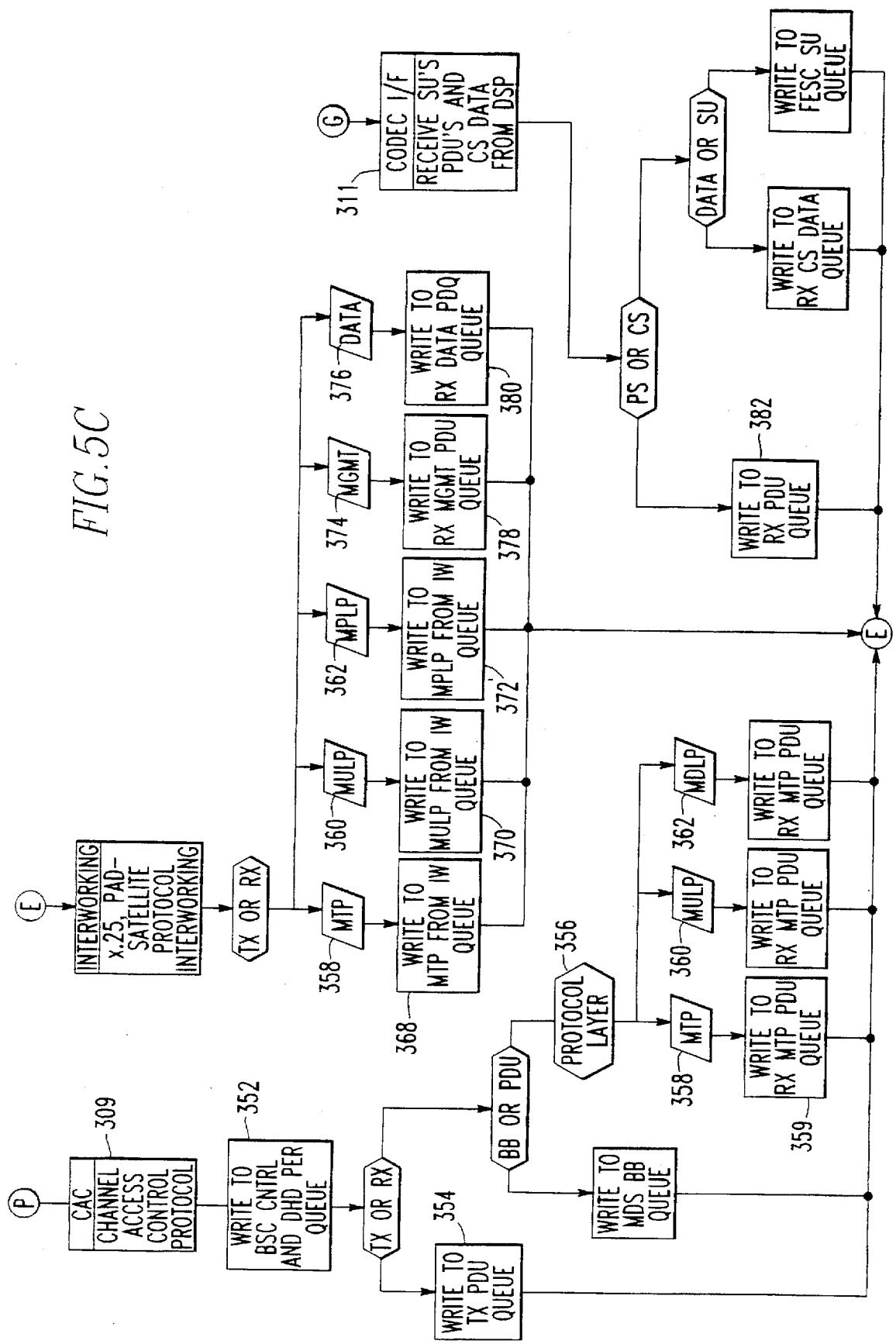

MOBILE TERMINAL APPARATUS AND METHOD FOR A SATELLITE COMMUNICATION SYSTEM

This application is a continuation-in-part of U.S. patent application Ser. No. 08/242,400 filed May 13, 1994 entitled "Mobile Terminal Apparatus and Method For A Satellite Communication System," which has been abandoned.

BACKGROUND OF THE INVENTION

1. Field of the Invention

The present invention relates to mobile terminal apparatus; and more particularly, to mobile terminals for communication via a satellite network.

Although suitable for communication via satellite networks where the satellite is at a low or medium altitude, the mobile terminal of the present invention is particularly suited for communication via a satellite network having a high altitude geosynchronous satellite; and will be particularly described in that connection.

2. Related Applications

U.S. patent application entitled "Mobile Terminal Apparatus and Method Having Network Inter-Operability filed by Patrick W. Baranowsky II, Craig R. Meseke, and Brooks Cressman filed on the same date as the instant application, and which is a continuation-in-part of U.S. patent application Ser. No. 08/242,110 filed on May 13, 1994, is incorporated by reference.

U.S. patent application entitled "Carrier Acquisition Technique For Mobile Radio QPSK Demodulator" filed by Brian W. Kroeger, Joseph B. Bronder, and Jeffrey S. Baird on the same date as the instant application, now U.S. Pat. No. 5,598,441.

U.S. patent application entitled "Locally Coherent QPSK Detection With Differential Decoding For A Fading Channel" filed by Brian W. Kroeger, Joseph B. Bronder, and Jeffrey S. Baird, on the same date as the instant application is incorporated by reference.

U.S. patent application entitled "Digital Quadriphase-Shift Keying Modulator" filed by Brian W. Kroeger and Roy Stehlik on the same date as the instant application, is incorporated by reference, now U.S. Pat. No. 5,523,726.

U.S. patent application entitled "Numerically Controlled Oscillator With Complex Exponential Outputs Using Recursion Technique" filed by Brian W. Kroeger and Jeffrey S. Baird on the same date as the instant application, is incorporated by reference, now U.S. Pat. No. 5,517,535.

U.S. patent application enetitled "Carrier Tracking Loop For QPSK Demodulator" filed by Brian W. Kroeger, Jeffrey S. Baird, and Joseph B. Bronder on the same date as the instant application, is incorporated by reference, now U.S. Pat. No. 5,579,345.

U.S. patent application entitled "Symbol Synthronizer Using Modified EarlyPunctualLate Gate Technique" filed by Brian W. Kroeger, Joseph B. Bronder, Tod A. Oblak, and Jeffrey S. Baird, on the same date as the instant application, is incorporated by reference.

3. Description of Related Art

In a typical satellite communication system, outgoing RF signals transmitted from a mobile terminal unit are received directly by the satellite. The satellite in turn retransmits the RF signals to a ground station that is connected by wire to a public switched telephone network (PSTN), which in turn routes the outgoing signals to either a conventional telephone or to another mobile terminal unit of a satellite or cellular network. Incoming signals from a conventional wired telephone are conducted from the PSTN to the satellite ground station, which in turn transmits RF signals to the satellite for retransmission to the mobile terminal unit. Thus, communication can be between two mobile terminal units or between a mobile terminal unit and a conventional telephone connected to a PSTN, or between a satellite mobile terminal unit and a cellular mobile terminal unit, for example. In each of the aforesaid conditions, the communication is routed through a PSTN. Also, communication can be with a radio base station type ground station which communicates via terrestial RF with mobile radios, such as taxicabs.

Presently, satellite systems that cover large geographical areas typically use several satellites that follow different paths at low or medium altitudes so that at least one satellite is at all times covering the desired geographical area. From the standpoint of receiving signals, the low and medium altitude satellites have the advantage of being able to transmit a signal that reaches a mobile terminal unit at the earth's surface with a relatively large amplitude and without appreciable fading. However, such satellite networks are limited in their coverage area per satellite.

It has been proposed, to provide a satellite communications network that utilizes a high altitude geosynchronous satellite which is capable of covering an area corresponding to a substantial portion of the North American continent, so that a total of approximately 6 satellite beams will cover the entire continent from Alaska to Mexico. The satellite for such a network will be approximately 22,600 miles above the equator and will be designed to operate in the L-Band of RF frequencies. For example, the frequency of the signal being transmitted to the satellite will be between 1626 MHz to 1660 MHz; and the frequency of the signal received from the satellite will be between 1525 MHz to 1559 MHz.

Energy travelling this great distance undergoes huge attenuation such that the power flux density incident at the antenna of the mobile unit is approximately $10^{-14}$ watts per square meter. This grossly attenuated signal is further degraded by background noise, and other satellite channel impairments such as Rician fading.

Mobile terminal units capable of receiving signals of this order of amplitude were either limited to paging signals or required extremely sophisticated hardware, which is bulky and heavy and does not lend itself to mobility. Also, the limited functions and expense of such terminal equipment would prevent its acceptance among a large segment of potential users.

In light of the foregoing, there is a need for a mobile terminal unit that is not only capable of reliably receiving the attenuated signals, subject to Rician fading, of a high altitude satellite for voice, facsimile, and data communication, but also compact, lightweight, and relatively inexpensive to manufacture.

SUMMARY OF THE INVENTION

Accordingly, the present invention is directed to a mobile terminal apparatus for a high altitude satellite communication network that is able to be used for voice, data, and fax communication which substantially obviates one or more of the problems due to limitations and disadvantages of the related art.

Some of the advantages of the mobile terminal apparatus of the present invention is that it overcomes difficult satellite communication channel characteristics such as low receive power, receive signal fading which is caused by both amplitude and phase effects, and close-in adjacent RF channel interference; and yet is compact, lightweight, relatively inexpensive to manufacture, and is sufficiently flexible and adaptable to permit modification for a variety of different applications with a minimum of hardware redesign.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the invention is a mobile terminal apparatus comprising a user interface; a digital signal processor board coupled to the user interface; an antenna for radiating and collecting signals from a satellite; an RF section coupled to the antenna for transmitting the signals to be radiated and receiving the collected signals, the RF section being coupled to the processor board for processing the signals received from and transmitted to the RF section.

In a more specific aspect, the RF section includes a transmitter having a first D/A converter operative to convert digitized waveform samples from the processor to an analog waveform, and an upconverter coupled to the first D/A converter and the antenna through a high power amplifier for modulating and amplifying the analog signals to be radiated by the antenna. The RF section includes a receiver having a down converter coupled to the antenna through a low noise amplifier for converting the signals collected by the antenna and amplified by the low noise amplifier to an IF signal, and a first A/D converter coupled to a down converter operative to convert the IF analog waveform into digitized samples of the IF waveform. The processor board includes a digital signal processor having an output coupled to said first D/A converter for applying the digitized waveform samples to be converted to the transmitter. The digital signal processor has a digitally implemented demodulator with an input coupled to said first A/D converter for receiving and demodulating the digitized IF waveform samples. A control processor is mounted to the processing board and is coupled to the digital signal processor and user interface for controlling operation of the digital signal processor, in accordance with a plurality of individual tasks that communicate via first in/first out message queues and event flags which are on/off signals representing input, output and timing events, and wherein task execution is controlled by the event flags and presence of data in the queues.

It is to be understood that both the foregoing general description and the following detailed description are exemplary and explanatory and are intended to provide further explanation of the invention as claimed.

The accompanying drawings which are included to provide a further understanding of the invention and are incorporated in and constitute a part of this specification, illustrate one embodiment of the invention and together with the description serve to explain the principles of the invention.

BRIEF DESCRIPTION OF THE DRAWINGS

FIG. 1 is a schematic block diagram of a mobile terminal apparatus in accordance with the present invention;

FIGS. 4A, 4B, and 4C, and 4D is a flowchart of the initialization and operation of the control processor of FIG. 1 in the circuit switching mode; and FIGS. 5A, 5B, and 5C is a flowchart of the initialization and operation of the control processor of FIG. 1 in the Packet Switching mode.

DESCRIPTION OF THE PREFERRED EMBODIMENT

Figure 2A:
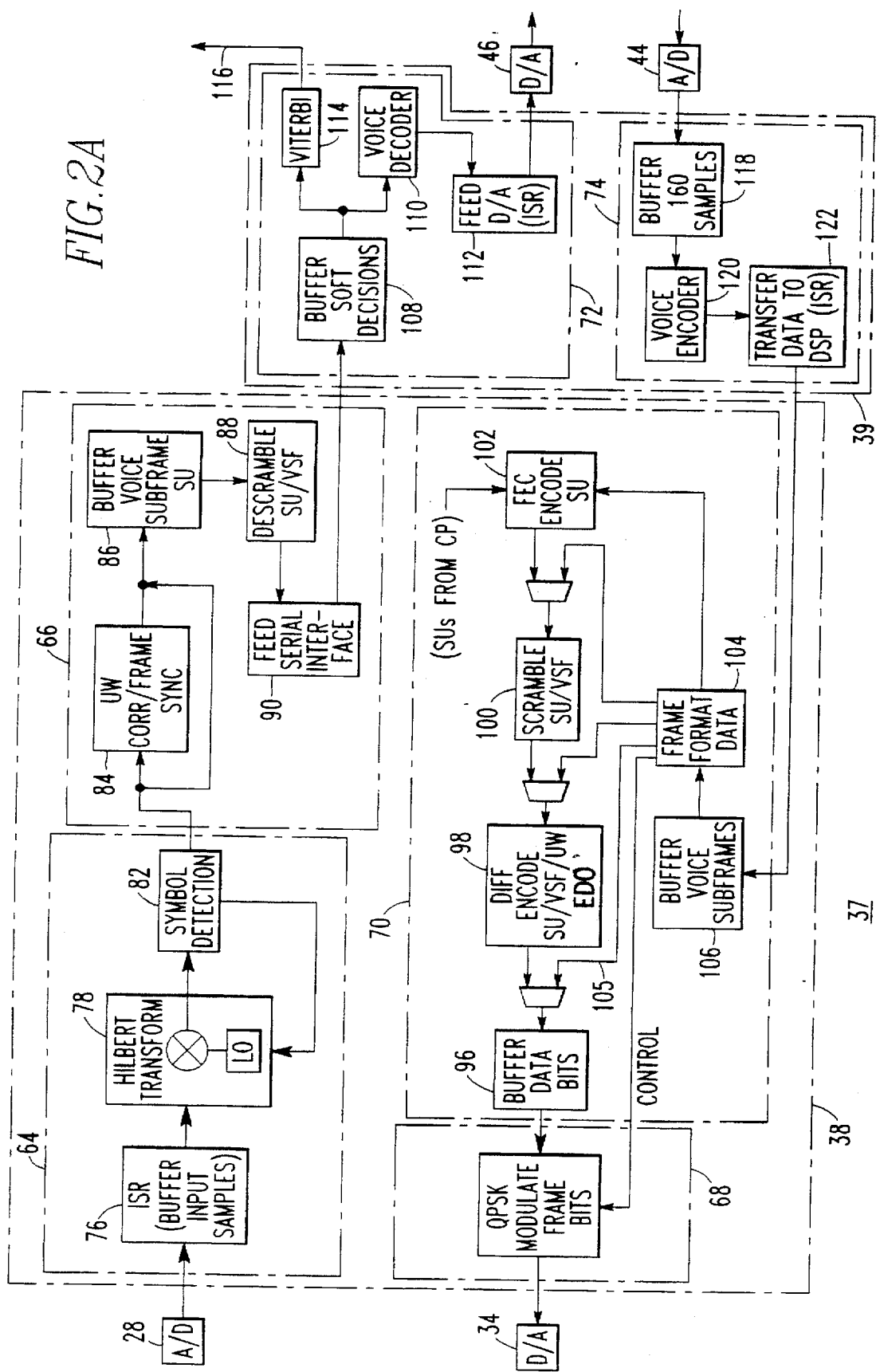
FIG. 2A is a schematic block diagram of the digital processing architecture apparatus of FIG. 1 for the voice mode.

Reference will now be made in detail to the present preferred embodiment of the invention, an example of which is illustrated in the accompanying drawings.

The mobile terminal unit of the present invention, comprises a transceiver 12, an antenna 14, and one or more user interfaces 16. The transceiver 12 has an RF section 18 and a processor board 20.

In accordance with the invention, the RF section has a receiving portion that includes a low noise amplifier, a down converter comprised of a mixer and synthesizer, and an analog-to-digital converter. The RF section of the present invention also has a transmitter portion that includes a high power amplifier, an upconverter modulator, and a digital-to-analog converter.

As herein embodied, the receiver portion includes a low noise amplifier 22, a synthesizer 24, a mixer 26, and an analog to digital converter 28. The transmitter portion includes a high power amplifier 30, an upconverter 32, and a digital-to-analog converter 34. The antenna 14 is connected to the RF section through a diplexer 36.

The processor board of the present invention has a digital signal processor, a control processor, a universal synchronous/asynchronous receiver/transmitter, and a plurality of analog-to-digital converters and digital-to-analog converters. As herein embodied, a digital signal processor 37 includes a modem 38 and a coder/decoder and fax processor 39, a control processor 40, a universal synchronous/asynchronous receiver/transmitter 42, an A/D converter 44, a D/A converter 46, and a FAX interface unit 48. The user interfaces of the terminal unit of the present invention include an input/output 52 for a handset, an input/output 54 for a fax machine and an input/output 56 for connection to a personal computer. The apparatus may also include a cellular transceiver board 59.

The antenna assembly 14 may be one of several different types depending on the particular application of the mobile terminal unit. For land vehicles, a phased array antenna, which is a flat plate about a foot in diameter, is considered advantageous in that the gain of the antenna in the direction of the signal does not drop below 9 dB and also because the phased array is aesthetically pleasing on smaller vehicles. The antenna assembly 14 may also be a mechanical antenna which is less rugged. However, the mechanical antenna is advantageous in that it can dither at small intervals, and thus can maintain extremely accurate satellite tracking when used in conjunction with an angular position determinant. A third alternative, is an omnidirectional mast antenna which must be approximately three feet in length. For mobile terminal units with a cellular transceiver, a second antenna 14' is provided.

The mobile terminal unit of the present invention may be used with a geosynchronous satellite, such as 60, which has broad beam coverage over the geographical regions in which the satellite antennas are pointed. The mobile terminal unit, hereafter referred to as MT, transmits and receives energy to and from the satellite respectively through the one antenna 14. The most dominant feature of the satellite communication link between the satellite 60 and the antenna 14 is the extremely low satellite power that is received. The satellite 60 is assumed to be traveling in an orbit 22,600 miles, above the equator, and energy traveling this distance to the MT undergoes huge attenuation, such that power flux density incident at the MT antenna is approximately −135 dB Watts/Meter$^2$, or approximately $10^{-14}$ watts per square meter as previously mentioned.

An L-Band signal which may be of a frequency between 1525 to 1550 MHz, is received through the MT antenna 14 and passed into the MT RF section. Since the MT transmit and receive signals may be simultaneously present, or operate in a full duplex fashion, at the antenna, they are separated into their respective paths by the diplexer 36. The diplexer employs a dual bandpass filter with one filter tuned to the transmit band and the other filter tuned to the receive band of frequencies. Thus, the diplexer steers the receive signal into the receive path. The signal exits the diplexer and is then amplified by the low noise amplifier 22 before it passes into the next RF stage. The low noise amplifier 22 boosts the power level of the original signal and sets the noise level of the receiver to a minimum. In other words, the amplifier 22 establishes the noise figure of the MT receiver. The amplified L-Band receive signal exits the low noise amplifier 22 and is mixed down or in other words down converted to a low intermediate frequency (IF) signal by the mixer 26 and synthesizer 24 and then sampled by an analog-to-digital (A/D) converter 28. This provides an output in the form of digitized IF waveform samples to the processor board 20.

The transmit signal begins in the processor board 20 as digital data, which is then converted into digitized, modulated waveform samples. This digitized waveform, which is created by the processor 37 is conducted to the digital-to-analog (D/A) converter 34 before the quadrature, modulator upconverter 32 of the RF section. The converter 34 converts the digitized waveform into both an analog I (in phase) and Q (quadrature) waveform. The analog I and Q waveforms are then sent to the mixer or upconverter quadrature modulator 32 where they are upconverted to an L-Band, and then summed to form a low level L-Band transmit signal on line 62. This low level L-Band transmit signal is amplified by the high power amplifier 30. The resulting high level L-Band transmit signal then passes through the transmit side of the diplexer 36 and is steered towards the MT antenna 14 from which it travels to the satellite 60.

In operation, the DSP 38 reads the received signal waveform samples from the A/D converter 28, and processes these samples as they arrive. The L-Band receive signal must be mixed down to the low IF frequency to aid in signal filtering and also to slow down the A/D sample rate so that the digital signal processing can keep up with the sample arrival rate. Once the receive signal has been sampled and loaded into the DSP 38, all subsequent signal processing is performed by the DSP 38 and 39 as controlled by the control processor 40. Received signals are demodulated, in other words translated from their waveform representation into their digital data representation, decoded and packaged for voice, fax or data processing at the DSP 39. The signal degradations of the high altitude satellite are mitigated by the channel protocol and data encoding scheme herein described. For example, repeat strategies, a combination of forward error correction, interleaving and scrambling, all aid in minimizing and spreading the effect of errors on the channel. The demodulator of the digital signal processor 38 achieves signal acquisition and tracking under degraded receive signal conditions. All of these functions are implemented digitally in software within the processor board of the MT.

The control processor 40 performs byte level and waveform manipulations and the DSP's 38 and 39 perform bit level and waveform manipulations. The DSP 38 implements the modem as well as the real time satellite framing function that includes circuit switched, packet switched and signaling frame formats together with low level bit manipulation algorithms. An executive provides overall control and call sequence around which the processing functions are built. Interrupt Service Routines (ISR) are used to feed the signals from the DSP 38 to the DSP 39, and from the DSP's 38 and 39 to control processor (CP) 40 communication interfaces. The DSP 39 contains the Codec, Viterbi, and Fax protocol functions.

In accordance with the present invention the processor board comprises a signal processor including a digitally implemented demodulator function, a digitally implemented modulator function, a digitally implemented receive framing function coupled to the demodulator, a digitally implemented transmit framing function coupled to the modulator function, and a digitally implemented encoding function and decoding function coupled to the transmit and receive framing functions, respectively.

As herein embodied and referring to FIG. 2A, which illustrates the processing architecture for the voice mode, the signal processor 37 is comprised of two individual DSPs 38 and 39. The digital signal processors 38 and 39, which are preferably of the fixed point type, run at a clock speed of approximately 27 MHz. At one instruction per cycle, these DSPs provide 27 million instructions per second of processing throughput. Each such digital signal processor is preferably of the type manufactured by Texas Instruments known as a TMS 320C51 type. The control processor 40, is preferably a microcontroller of the type manufactured by AMD as model 29200.

The DSP 38 includes a demodulator function 64, a receive framing function 66, a modulator function 68, and a transmit framing function 70. The DSP 39 includes a decoding function 72 and an encoding function 74.

The demodulator 64 includes a buffer 76, Hilbert transform function 78, and a symbol detector 82. The receive framing function 66 includes a Unique Word (UW) correlation frame synchronizer 84, a voice subframe buffer 86, a descrambler 88, and a feed serial interface function 90.

The modulator 68 includes a quadrature phase shift keying modulator. The transmit framing function 70 includes a data bit buffer 96, a differential encoder 98, a scrambler 100, a forward error correction encoder 102, a frame format function 104 and a voice subframe VSF buffer 106.

In the circuit switched (CS) voice mode, sometimes referred to as the Voice Single Channel per Carrier (SCPC) Mode, the mobile terminal apparatus of the present invention operates in a full duplex mode, simultaneously transmitting and receiving voice mode frames. The timing of the transmit and receive satellite channels are asynchronous to one another.

In operation, the demodulator 64 receives the digital samples of the waveform from the A/D converter 28 after being shifted to a low intermediate frequency (IF) as previously described in connection with the RF section 18. This buffering takes place at function 76 via software interrupt service routine (ISR) which is triggered by an interrupt from the A/D hardware each time a 16 bit sample is present. While samples are being accumulated by this background process, the executive or main loop of the DSP 38 which is hereinafter described, continually monitors this process to see if enough samples have arrived to begin the receive chain processing.

In processing the blocks of samples, the Hilbert Transform subfunction 78 shifts the real signal to a complex IQ baseband signal. Because this baseband signal can be affected by Doppler shift, and because there is an inherent receive frequency error due to drift between the reference oscillators of the mobile terminal and the ground station channel unit (CU), a frequency correction factor is fed back to the Hilbert Transform from the frequency tracker or correction function located in the symbol detector or detection function 82. Outputs of the Hilbert Transform function are written to the in-phase (I) and quadrature (Q) phase input buffers of the detector 82. The detector 82 in conjunction with a matched filter recovers the shape of the QPSK symbols from the received waveform and aids in symbol tracking or timing. The detected symbols in the form of soft decisions are (8 bit signed magnitudes) output to the receive framing function 66.

The main purpose of the receive framing function 66 is to unpack the information data contained within the satellite frame. The receive framing function 66 is commenced each time a block of 16 symbols has accumulated. In the voice mode, the receive framing function 66 detects frame boundaries in the data stream at function 84, buffers subframes at function 86, and then descrambles each of the voice subframes (VSF) or signaling units (SUs), as the case may be, at 88. The frame boundaries are located by the UW correlator/frame synchronizer 84 which performs an autocorrelation on a 24-bit frame marker sequence UW. Processed voice subframes or SUs (128 soft decisions) from the function 84 are buffered at 86 and fed serially after being descrambled at function 90 to the DSP 39. This serial feeding is accomplished by an ISR of DSP 38.

The decode function 72 of the DSP 39 includes a soft decision buffer 108 which is fed by serial receive ISR. This routine reads one word (16-bits of data) at a time and sets a flag when a complete subframe has been buffered. A voice decoder function 110 is called every 20 milliseconds regardless of whether a Received Voice Subframe (VSF) is present since the voice decoder 110 is a slave to voice transmit timing. If a received VSF is present, it is input to the voice decoder function 110. If a VSF has not yet arrived due to the asynchronous nature of the satellite transmit and receive chains, or, if a SU has been substituted for a VSF, the voice decoder 110 is called with the subframe repeat flag set. This allows the voice decoder to maintain its timing and signal history even when a VSF is not available for decoding. The voice decoder 110 outputs 20 ms worth of digital samples to a D/A buffer 112. These samples are fed to the D/A serial interface by the ISR associated with the D/A 112. If a signal unit SU is present, a Viterbi decoder 114 is activated after the voice decoder 110 completes its function. The Viterbi decoder 114 reverses the forward error correction (FEC) and coding applied to the data at the transmitter and also attempts to correct bit errors. Viterbi decoded SUs (96 "hard" bits) are read from the SRAM of the DSP 39 by the control processor 40 in response to an interrupt from the DSP 39 as shown at line 116 of the Viterbi decoder 114.

The analog samples from the handset 52 (FIG. 1) are digitized by the A/D converter 44. The 8 KHz digital samples of the analog waveform originating from the MT handset 52 are buffered at 118 with the ISR associated therewith. Each time 20 ms worth of samples are collected, the Executive Software (SW) of the DSP 39 activates a voice encoder function 120. This voice encoder function performs what is termed an improved multiband excitation (IMBE) digital signal processing algorithm to convert the information in these samples to a compressed 128 bit voice subframe (VSF). The VSF and a SW flag, indicating whether voice activity is present in this subframe, or in other words whether or not the user is currently speaking, are transferred to a serial transmit buffer 122. The ISR associated with this buffer transfers the data across a serial interface to the DSP 38. As each 16-bit word of the VSF data is received by the DSP 38, an interrupt is triggered which causes the ISR associated with the buffer VSF function 106 to transfer the data to VSF input queue of the transmit framing function 70 of the DSP 38.

The primary purpose of the transmit framing function 70 is to package information data, both VSF and SU, into the voice mode satellite frame format. While there is voice activity, the frame format data function 104 builds voice frames consisting of a 24-bit frame marker unique word (UW) sequence followed by six VSFs or 5 VSFs and a signaling unit (SU). SUs which are used to convey system control information are passed to DSP 39 from the CP 40. These SUs are three-quarter rate forward error correction convolutionally encoded at 102 before they are scrambled at 100, and differentially encoded at 98. VSFs bypass the encoder in DSP 38 since they are block encoded by the voice encoder 120 in DSP 39. Unique Word (UW) sequences bypass all but the differential encoder as seen at line 121. All processed bits are output to the transmit buffer 96 which feeds the modulator function 68.

While voice has been active, the frame format logic of the transmit framing function 70 checks for voice activity at the end of each voice frame. If voice activity has ceased and there is no SU to send, an "end of data" (EOD) sequence is differentially encoded and written to the modulator buffer. In addition, transmitter control information is passed to the modulator function 68 that disables the high power amplifier 30 (FIG. 1) of the transmitter at the end of the EOD sequence. Since voice activity can resume at any subframe within a frame, the transmit framing logic of frame format function 104 must maintain frame timing and positioning while voice is inactive. In addition, a 256 bit "activity burst" consisting of the 232 bit preamble followed by the UW sequence is transmitted every 480 ms while the voice remains inactive to keep the channel alive. When voice activity resumes or an SU needs to be transmitted, the transmit framing function 70 starts a new burst with a preamble consisting of a 116 bit CW sequence followed by a 116 bit timing sequence on line 105. Transmitter control information is passed to the modulator function 68 to enable the high power amplifier 30 of the transmitter at the start of the preamble sequence. The final software function of the transmit chain, the modulator 68, is fully contained in the ISR associated with the modulator, which runs at the sample rate of the D/A converter. This function shifts symbols from the 16-bit words in the transmit buffer 96. For each symbol, eight complex base band samples are read from a lookup table to produce a filtered QPSK symbol at the input of the digital to analog converter 34. Samples of each symbol are fed to the D/A hardware 34 of the MT. In addition, transmitter control is output by the modulator 68 at the start and end of each burst to perform on/off control of the high powered amplifier in the MT transmitter hardware.

Figure 2B:
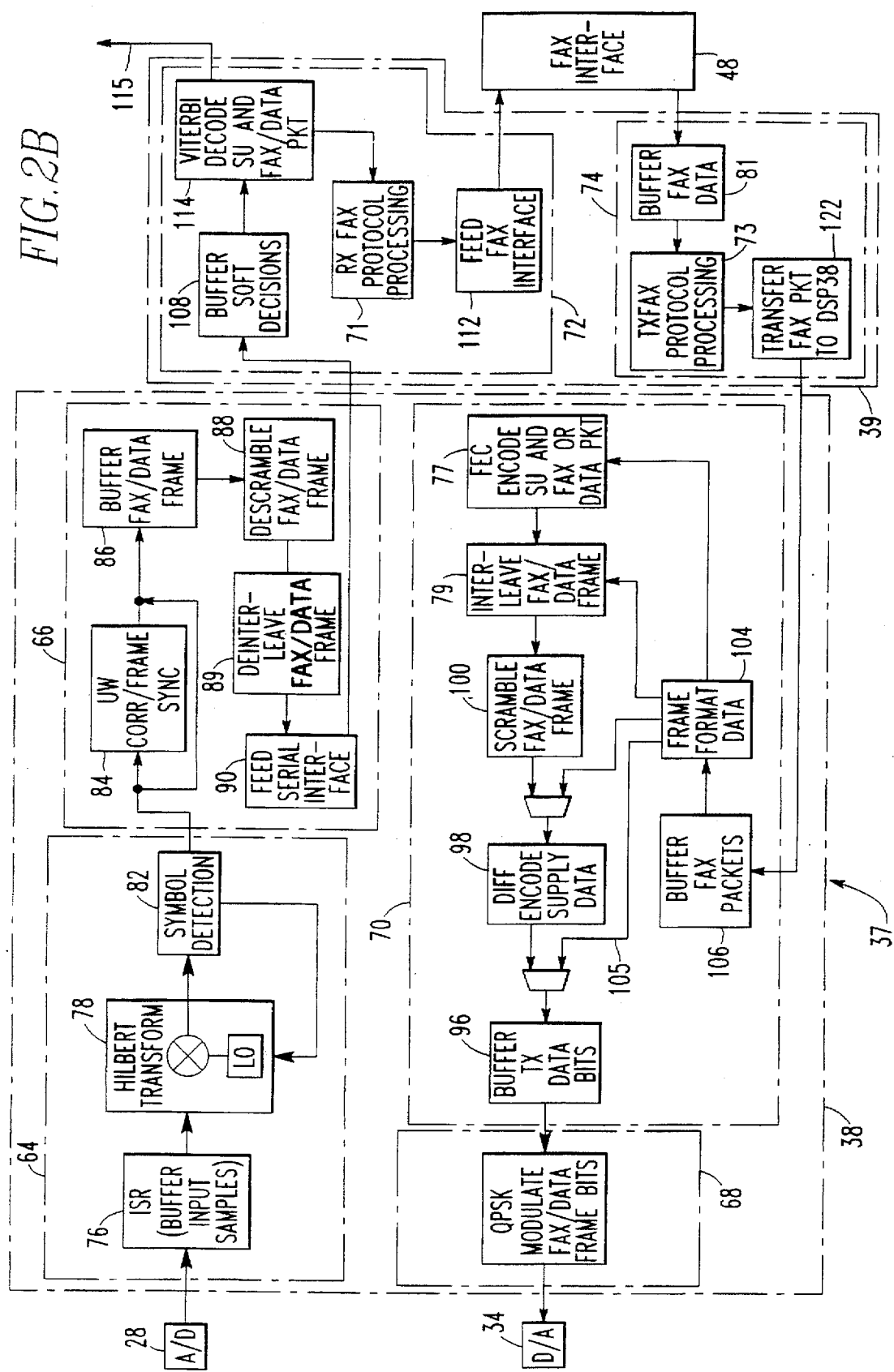
FIG. 2B is a schematic block diagram of the digital processing architecture apparatus of FIG. 1 for the FAX and DATA modes.

In FIG. 2B, which illustrates the processing architecture of the digital signal processors 38 and 39 in the FAX and data modes, the same reference numerals for the functions similar to FIG. 2A are used. Where a function is similar to the voice mode and the only difference is that it is performed on or with FAX and data bits, the function will be considered similar. For the sake of brevity, similar functions will not be repeated in the description. The MT of the present invention supports 2400 baud FAX and data SCPC calls, as well as 4800 baud data SCPC calls. The MT operates in full duplex in all SCPC modes. The call type which can be either 2400 baud FAX, 2400 baud data, or 4800 baud data, determines what frame format is utilized by the MT transmit framing function 70 and the receive framing function 66. In the 2400 baud modes, a signaling unit SU is present in every frame. In the 4800 baud data mode, an SU may be inserted into a frame, but is not inserted in every frame. In the FAX mode, data originates and terminates in the digital signal processor 39 as indicated by the receive FAX protocol processing block 71 and the transmit FAX protocol processing block 73 respectively. In the data modes, data packets are passed to the DSP 38 from the control processor 40, since the control processor interfaces with the user Data Terminal Equipment (DTE) and also hosts the Hayes data function. The demodulator and modulator functions 64 and 68 in the DSP 38 remain the same in all voice, data, and FAX SCPC modes since the satellite transmission rate and modulation technique remain constant.

The FAX/data mode receive framing function 66 in the DSP 38 is similar to the voice mode receive framing function. The two primary differences are the FAX and Data frames must be deinterleaved at block 89 before they are sent to the Viterbi decoder 114 in the digital signal processor 39; and the buffering subfunction at block 86 of the received framing 66 must buffer a different number of soft decisions than in the voice mode before calling the descramble subfunction at block 88.

The FAX/data mode transmit framing function 70 in the DSP 38 FEC encodes all the bits within a FAX data frame at block 77. In the voice mode only the SUs are encoded. The encoded bits and "pad" bits in the 2400 baud modes are then sent to the interleaver subfunction at block 79 of FIG. 2B which reorders the frame bits to protect against destruction of information due to burst errors encountered during satellite transmission. The remaining processing applied to the frame bits of the transmit framing 70 is identical to the processing applied in the voice mode that was previously described.

In the 2400 baud FAX mode, the DSP 39 hosts the fax transmit and receive protocol functions as previously mentioned. These functions as indicated at box 71 and 73 interface directly with a FAX modem chip or interface unit 48 which, in turn, communicates with the FAX machine. Data flowing to and from the modem chip is buffered by ISRs at 112 and 81, respectively, of the DSP 39.

On the receive side, the DSP 39 also hosts the Viterbi decoder at block 114o Soft decisions received from the DSP 38 are buffered by the ISR at 108 in the DSP 39 and then Viterbi decoded. Decoded SUs and data packets are routed to the control processor 40 as indicated at line 115, whereas the decoded FAX packets are further processed by the receive FAX protocol processor function at block 71.

Figure 2C:
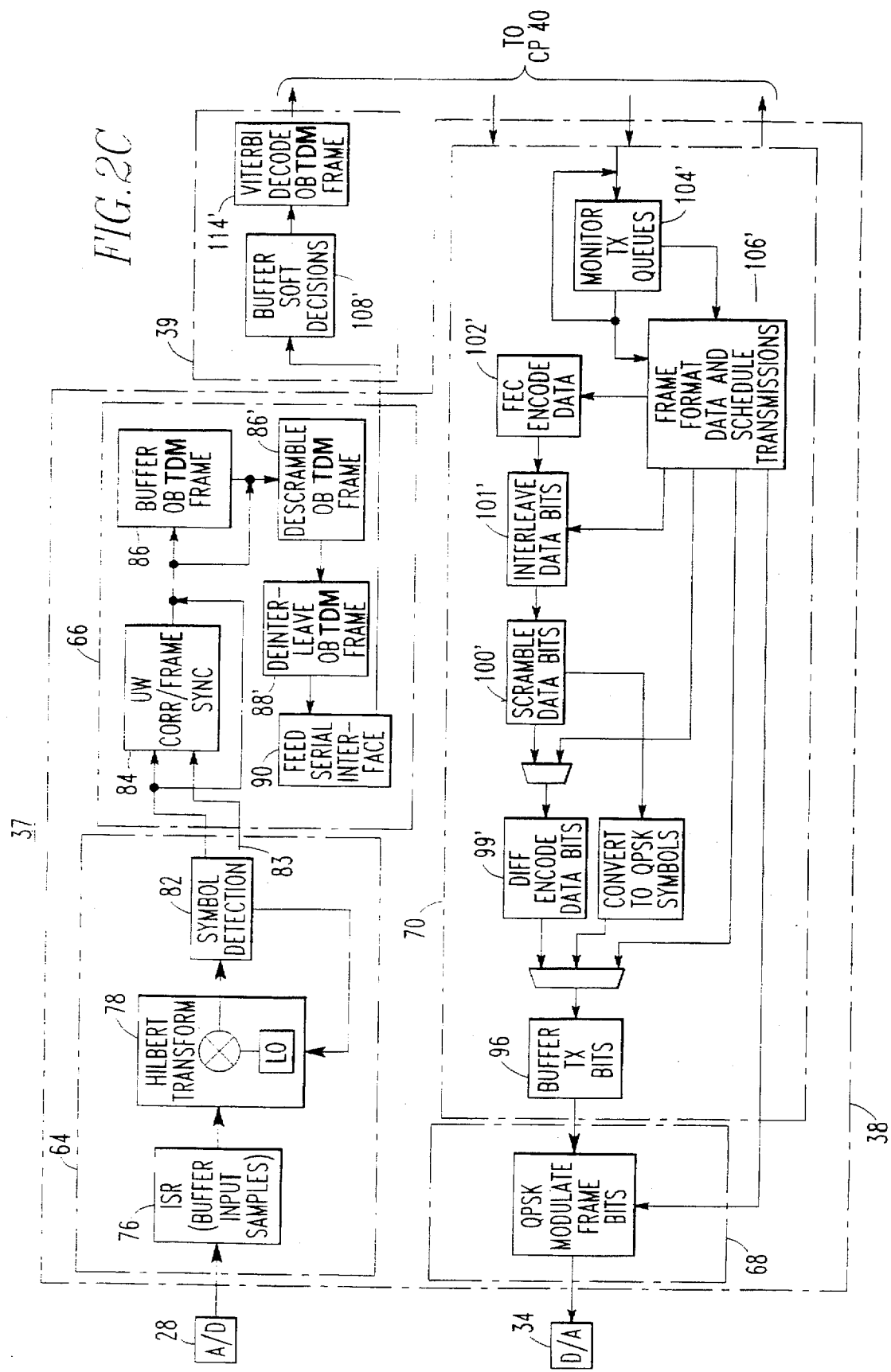
FIG. 2C is a schematic block diagram of the digital processing architecture apparatus of FIG. 1 for the Signaling and Packet Switched modes.

In FIG. 2C, which illustrates the processing architecture of the digital signal processors 38 and 39 in the Signaling and Packet Switched modes, the same reference numerals for the function similar to FIGS. 2A and 2B are used. For the sake of brevity, similar functions will not be repeated in this description. In addition to the SCPC modes described in connection with FIGS. 2A and 2B, the MT will support a Packet Switched Data Service, hereinafter referred to as the PS mode, or a signaling service or mode. The signaling mode is used in MTs that don't support the PS mode. As previously described, these MTs are in the signaling mode when not engaged in an SCPC call. Thus, this is basically an idle mode where the MT monitors an Outbound Time Division Multiplexed Channel hereinafter referred to as an OB TDM sent from the Group Controller (GC) of the communication system. The MT receives configuration information as well as incoming call SUs on this channel. The MT transmits on various signaling channels as part of the call setup procedure or to respond to polls from the GC. A MT that supports the PS mode monitors the OB TDM channel used by the Data Hub (DH) to send configuration information as well as user data packets. Thus, the PS mode and the signaling mode are mutually exclusive. In other words if a MT supports the PS mode, it does not need the signaling mode.

As shown in FIG. 2C the demodulator 64 functions the same as the SCPC mode demodulator of FIGS. 2A and 2B with the additional capability of providing a clock source for timing transmit bursts as shown on line 83. This clock is needed since unlike the SCPC mode, the receive and transmit timing are tied together in the PS and the signaling modes. The clock is updated by the demodulator 64 at the symbol rate (3375 Hz). Then each time the demodulator passes a block of symbols to the receive framing 66, it also passes the symbol clock time stamp associated with the first symbol in each symbol block. The receive framing 66 processes either the OB TDM of the DH or the OB TDM of the GC, depending upon what type of MT it is. The processing of these two channels is essentially the same with minor differences in the frame formats. For both of these channels, the receive deframing performs the UW correlation function at block 84 and then descrambles and deinterleaves at block 86' and 88'. Upon the detection of Unique Word UW at block the receive framing also calculates the symbol clock time associated with the first symbol of the UW pattern by adding an offset to the clock time passed to it by the demodulator 64 over line 83. This offset reflects where in the symbol block the UW actually started. The calculated time stamp is then stored in memory for use by the transmit framing 70, because transmit bursts are timed relative to the starting edges of the received OB TDM frames. In the PS mode, this frame start time stamp is also passed on to the DSP 39 for eventual routing to the control processor 40 with the received data packets. The CP 40 needs the time stamp since allocation times requested by the MT from the DH are received from the DH as offsets to the edge of the frame in which it was received. When the upper layers need to send a Time Division Multiple Access (TDMA) transmission, the CP passes the departure time for the transmission down to the transmit framing 70 along with the data packet.

To complete the receive chain processing, the data is Viterbi decoded by the DSP 39. The decoded SUs in the signaling mode or the decoded data packets in the PS mode are passed to the CP 40 for processing by the upper protocol layers.

The transmit chain of the MT operates in a "burst" mode. In other words the transmitter idles until an SU in the signaling mode or a data packet in the PS mode is queued by the CP 40 for transmission by the DSP 38. When the data arrives in the transmit queues at block 104' the transmit framing prepares the data for transmission at block 106' by applying FEC encoding at 102', interleaving at 101', scrambling at 100' and differential encoding at 99' to the data bits. The data is framed according to the burst type specified by the CP 40. In the present embodiment, there are two different frame formats used in the signaling mode and four frame formats in the PS mode.

The transmit framing 70 determines when the packet should be transmitted. This decision depends upon the transmission protocol that is utilized for a particular burst type. There are two different transmission protocols used by the transmit framing. One is the well known slotted-Aloha and the other is the TDMA. In the signaling mode, the slotted Aloha is used for access requests initiated by the MT; and TDMA is used to respond to the GC at a specific scheduled allocation time. In the PS mode, the slotted Aloha is used to send small packets and to request allocations for large packets. TDMA is used to send large packets, to piggyback allocation requests, and to respond to polls from the DH.

To schedule slotted Aloha bursts, the transmit framing 70 must calculate the next available slot edge. Slot edges are defined relative to the received OB TDM frames. For example, the PS OB TDM frame is 1608 bits wide or 238.22 Ms at 6750 bps. Within this time period, there are four 402 bit wide "slots" defined for allocation request transmissions and two 804 bit wide slots defined for slotted Aloha transmissions of small data packets. The transmit framing uses the frame start time stamp provided by the receive framing as previously mentioned along with the symbol clock being ticked by the demodulator 64 to determine where it is in time relative to the start of the current OB TDM, and thus where the next closest slot edge will occur. The clock tick associated with the slot edge is used as the start time for the burst.

For TDMA allocations, the transmit time is passed to the transmit framing by the CP 40 along with the data packet in the PS mode. In the signaling mode, the TDMA slots (120 ms in width) line up in time with the OB TDM slots. By definition the response to an SU received in an OB TDM frame must be responded to 120 ms after the end of the OB TDM. Once the transmit framing determines the burst start time, the burst stop time is calculated as the start time plus the length of the burst in symbols. These times are passed to the modulator 68 along with the transmit data frames. While the modulator 68 is in an idle mode, it compares the current symbol clock time to the burst start time. If the times match, the modulator 68 enables the high power amplifier 30 (FIG. 1) and begins outputting samples to the D/A converter 34. While the modulator is producing samples, it compares the burst stop time to the current symbol clock time at the end of each symbol. When the times become equal, the modulator 68 (See FIGS. 2A-2C) turns off the HPA 30 and goes back to the idle state. In the signaling mode, the modulator 68 also issues an interrupt to the CP 40 when a burst terminates. This information is used by the CP 40 for burst duration monitoring which is part of the BIT hereinafter described.

The following description is applicable to all of the various operating modes of the MT of the present invention.

The responsibility of the demodulator portion of the DSP 38 is to convert the satellite received samples to packets of "soft" bits which are routed to the DSP 39 for further processing. On the transmit side, packets of bits are converted to digital samples by the modulator for transmission over the satellite link. Thus, the demodulator 64 and the modulator 68 is, in fact, a bidirectional pipeline process which is time intensive and one dimensional from a functional standpoint. In accordance with the present invention, the functions of the modulator, demodulator portion of the DSP 38 is operated from a main or executive loop instead of using an operating system. This has the advantage of reducing cost and minimizing execution cycles and memory. However, without an operating system, the timing requirements of the four functional partitions, that is, the demodulator 64, the receive framing 66, the modulator 68, and the transmit framing 70 are such that the routines are allowed to run to completion. This is accomplished by operating the demodulator 64 and the receive framing 66, sometimes referred to as a receive chain, on a block basis, or in other words, on a basis of multiple samples or bits. This operation is in contrast to operating the demodulator and receive framing on each sample or bit as it arrives. The block basis operation permits both the receive and transmit chains to run to completion before the next block of samples arrives. In the preferred embodiment, the chosen block size is 32 bits (sometimes referred to as 16 symbols) which at a 6750 bit-per-second transmission rate is equivalent to 32/6750 or 4.74 milliseconds per each block.

Because of the different processing requirements for the variety of services provided by the MT of the present invention, the 2400 baud FAX/Data, 4800 baud Data, Voice, and packet switched data services, the particular software of DSP 38 is capable of being switched by the CP 40 between an SCPC mode (or "call" mode) and the signaling mode, or between the SCPC mode and the Packet Switch Mode. These modes are referred to as "major" modes of operation in the DSP 38. The executive loop for the DSP 38 provides maximum flexibility and minimum switching delay between modes by monitoring for major mode commands from the CP 40 during every operation of the loop. This permits a major mode switch to be detected within 4.74 milliseconds and avoids the necessity of downloading separate software to the DSP 38.

Figure 3:
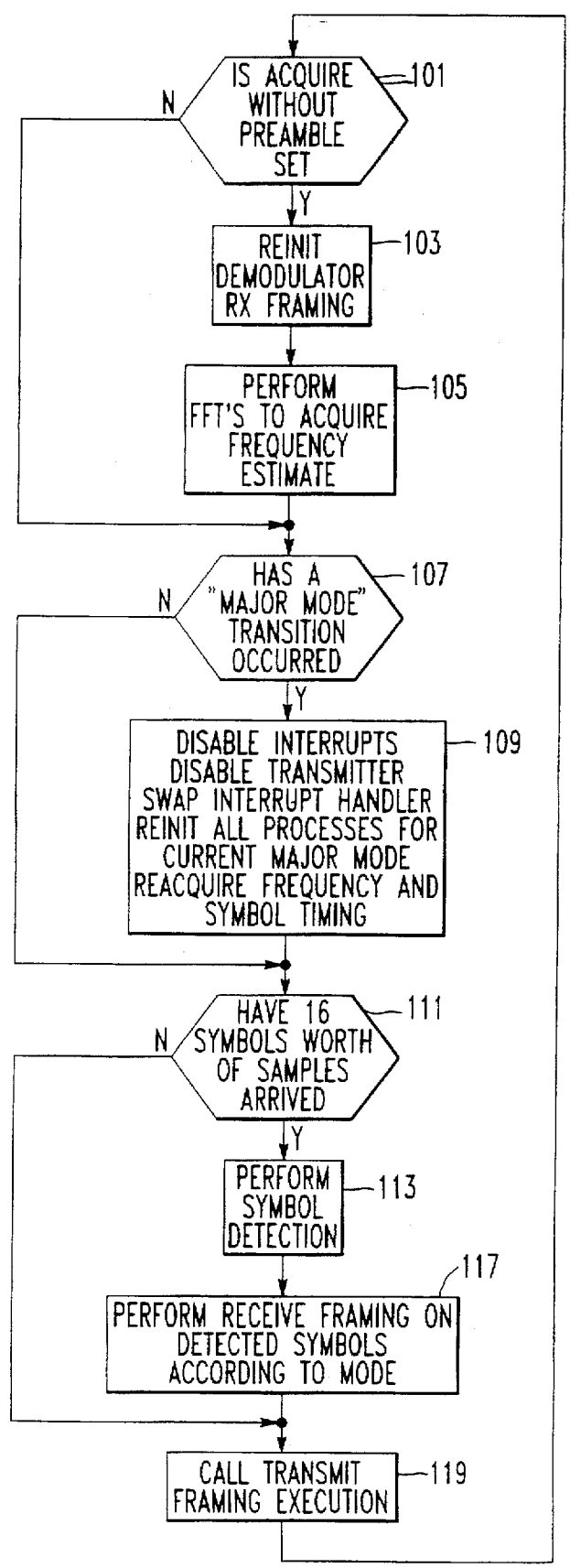
FIG. 3 is a flowchart illustrating the executive loop for the modem function of FIGS. 2A, 2B, and 2C.

Referring to FIG. 3, when DSP 38 is operating within a "major" mode, a flag referred to as an "acquire without preamble" can be set as indicated at decision block 101 which causes the demodulator 64 and the receive framing 66 to be reinitialized at function block 103. Then, the FFT's are performed to acquire the frequency estimate as indicated at function block 105. Thus, while the DSP 38 is operating within a major mode, it can be commanded by the CP 40 to reacquire the receive signal. This may occur during the signaling mode when the MT needs to switch channels due to signal strength degradation, or during a call if the MT has lost framelock due to signal fades or blockage. This could happen if the MT user drives through a tunnel, for example. The CP 40 detects these conditions by monitoring the received packet error rates and frame lock information provided by the received framing function 66. When appropriate, the CP 40 will pass the reacquire receive signal command to the DSP 38. The next executive decision is made at block 107 as to whether or not a "major mode" transition has occurred. If such a transition has occurred, the executive loop then disables interrupts, disables the transmitter, and switches the A/D interrupt handler address to correspond to the switched mode. In addition, the loop reinitializes all of the processes for the current major mode and reacquires the frequency and symbol timing, all as indicated at function block 109.

Following the major mode decision block 107, a decision is made at block 111 as to whether 16 symbols of samples has arrived at the input to the buffer 76 of the demodulator 64. If the samples have arrived, symbol detection is performed at block 82 of the demodulator 64 as indicated by function 113 of the executive loop. Then, the sixteen detected symbols are processed by the receive framing function 66 as indicated by function block 117 of FIG. 4.

The transmit framing function 70 is called each executive loop time for execution at block 119. When the transmit framing executive program is called at block 119, the decision to run the transmit framing function is made within this executive program, and is based on whether or not it is time to feed the modulator function 68 additional bits from the buffer 96. The receive and transmit functions in the DSP 38 are switched to submodes that exist within the SCPC major mode. These submodes are monitored in the respective executive loops of each of the processes. This efficient sequence of operations minimizes the reaction time of the MT to losses or degradations.

In the mobile terminal of the present invention, the control processor 40 provides the overall executive control of the functions and interfaces of the MT of the present invention. An executive program for multi-tasking may be the operating system known as the Nucleus RTX developed by Accelerated Technology, Inc. However, such an operating system may be of any type that is capable of performing the functions of the present invention.

In accordance with the present invention, the control processor performs system initialization, mode selection and control. Between the Packet Switched Services (PS) and the Circuit Switched Services (CS), the MT may exist in many distinct operational modes. Accordingly, the control processor 40 reconfigures the MT system to accommodate each of these modes.

In the mobile terminal of the present invention, the control processor 40 utilizes a commercial multi-tasking executive operating system in addition to a time management system to control the various tasks. All of the tasks of the control processor are independent, concurrent programs. The use of this multi-tasking reduces the number of parts and the cost of the terminal unit by permitting a single processor to replace multiple processors. The time management of the present invention provides efficient shared use of timer hardware. The control processor 40 includes tasks that communicate through first in/first out message queues and event flags, which are on/off signals representing input, output, or timed events. The execution of tasks is controlled by event flags and the presence of data in queues as described more in detail in connection with FIGS. 4A–4D.

In accordance with the invention, only two interrupt levels are used in order to provide flexibility in processor selection. Events are driven by external interrupts from the digital signal processors 38 and 39 for transmit and receive data on the satellite side of the MT, and from the handset, DTE, or fax ports on the user side of the MT. The DSP events, which cause an interrupt 3, are associated with data received from and transmitted to the satellite link. The handset, cellular radio and fax events generate the interrupt 3; and the data port and BSC events generate the interrupt 2. The interrupt service routines (ISR's) are not formal tasks, but interact with the tasks by setting event flags based on the source and specific cause of the particular interrupt.

In accordance with the present invention, the individual tasks performed by the control processor 40 are as follows (1) BIT The task BIT checks the nonvolatile memory checksums, the stuck on/off status of the transmitter, the high temperature status of the transmitter, the transceiver unit temperature, the availability of the handset, data, and Fax ports, the beam steering controller (BSC) status, monitors transmit burst duration, and resets watchdog timer.

(2) BSC I/F

The BSC I/F task coordinates the steering of the antenna main beam toward the satellite, processes the beam steering controller control messages and formats commands to the BSC, receives signal strength updates from the DSP demodulator and forwards the signal strength to the BSC and responds to BSC status changes.

(3) CAC

This is the Channel Access and Control (CAC) task to provide "unreliable" datagram delivery for mobile packet switched data service. It selects the proper channel, makes the TDMA slot reservations, schedules packet transmission, processes Data Hub Data (DHD) channel mobile data service framing, routes packets to upper layer protocols, performs Cyclical Redundancy Checks (CRC) on received packets, and computes the CRC on transmitted packets.

(4) Cellular I/F

This task controls the selection of satellite or cellular registration, relays messages from the cellular radio to the handset, relays control messages from the handset to cellular radio, and coordinates the cellular call handoff with the Signaling Protocol task.

(5) Channel Manager

This task performs the manual or automatic signaling channel selection, monitors the signaling channel performance, requests the TDM channel logon when required, performs the TDM channel change when necessary for beam cross over, and updates the system table to reflect changes in signaling channel status.

(6) Codec I/F

This task sets the channel type and mode for Codec DSP, checks the CRC for the group controller channel signaling unit, reports the CRC performance to channel manager task, reports the channel status to the Signaling Protocol task, culls the signaling units by the destination ID, routes circuit switched signaling units to MGSP (hereinafter described) or the Signaling Protocol task, routes the packet data units to the CAC task, and routes the received circuit switched data frames to the data IF task.

(7) Data I/F

This task emulates the "AT" data modem commands for the circuit switched data DTE, performs X.25, X.3, X.28, and X.29 protocols for packet switched data DTE, controls DTE port USART, sends call control messages to the Signaling Protocol task, controls the flow of data frames between the Codec DSP and the DTE port for circuit switched data, and controls the flow of protocol data units between the interworking tasks and the DTE port for packet switched data.

(8) H/S I/F

This task processes the keystrokes from the handset, services requests from other tasks to display indicators and text on the handset, arbitrates call requests/announcements among the handset, DTE, FAX, satellite modem and cellular radio, implements special features invoked by handset such as store/recall number, call timer, handsfree operation, and the like. In addition, this task controls the entry/display of configuration values such as enabled options, serial port data rate/character format, and operating mode.

(9) INIT

This task bootstraps the CPU, initializes on-chip peripherals, initializes external peripherals, performs diagnostics, restores power-down configuration, downloads the DSP's 38 and 39, and coordinates the task start ups.

(10) Int 2 ISR

This task sets the event flags indicating the source of the interrupt such as the BSC port, data port, for example, and controls the USART data transfers and buffering.

(11) int 3 ISR

This task sets the event flags indicating the source of the interrupt such as the modem DSP, Codec DSP, handset, and other hardware devices. It also controls the transfer and buffering of data to and from external devices such as the DSP memory, and custom serial interfaces.

(12) Interworking

This task converts between DTE X.25/X.29 and satellite packet protocols, minimizes address information in protocol data units, and provides automatic congestion control by priority and flow control.

(13) MDLP

This task provides link layer packet switched data protocol to the task MPLP, provides sequenced delivery of user packets, provides fragmentation and reassembly of packets, provides indication of link resets, and performs the network congestion management.

(14) MGSP

This task manages signaling transactions between ground station group controller and the MT for circuit switched service and controls the channel selection, channel access, slot timing, error recovery, and congestion.

(15) MODEM I/F

This task processes the modem DSP request (interrupt) to tune the frequency synthesizer, relays and buffers the circuit switched transmit data between the data I/F task and the modem DSP, receives transmit signaling units from the MGSP and Signaling Protocol tasks, buffers and forwards to the modem DSP 38. This task also receives transmit protocol data units from the CAC task, buffers and forwards to the modem DSP and updates the received channel status (unique word correlation/frame synchronization and signal strength) to the Signaling Protocol, Channel Manager, and BSC/IF tasks.

(16) MPLP

This task implements the packet layer protocol for set up, maintenance, and teardown of switched and permanent virtual circuits for packet switched data service, and provides services to establish connections, transfer data, and release connections for packet switched data service.

(17) MTP

This task provides command/response transaction protocol for packet switched data service, controls the retransmission of lost commands or response, and provides one way, no response message service.

(18) MULP

This task provides unacknowledged link protocol for moderate sized messages for packet switched data service, provides automatic message repeat service, provides segmentation service for messages exceeding the CAC packet size and provides multicast and broadcast capability.

(19) SIGNALING PROTOCOL

This task processes the signaling units and control messages, performs call setup and tear down protocols for a variety of call types, processes advance service features such as call waiting, or caller ID, maintains bulletin board data received from ground stations, processes MT and network management messages, monitors call status, updates the state of the MT based upon call progress, bit results, management messages and inputs from peripheral devices (handset, data port, fax port), and responds to abnormal conditions such as lost calls and hardware faults.

The various tasks as outlined above are executed upon receiving data in the queue of the particular task. In the event that more than one task is queued simultaneously, they are activated in accordance with a predetermined priority.

Referring to the flowchart of FIGS. 4A through 4D, the individual tasks are represented by rectangular blocks having a horizontal dividing line over which the title of the task is printed. The function blocks are plain rectangular blocks. The decision blocks are hexagon shape, and the parallelogram shaped blocks illustrate the entered information of the queue or the setting of an event flag of a particular task. The entry of the queued data or setting of an event flag activates a task, which performs one or more functions in accordance with the queued information or event flag. These functions in turn include the writing of information into various queues, the entry of which by the condition decision blocks activate one or more other tasks. In response to turning on the power, low level start-up initialization occurs at function block 130 and the executive initialization at function block 132. Assuming that this is initial start-up, no queues have been entered as indicated by the decision condition blockst and decision block 134 causes start up at 136. The INIT task at 138 via the condition block 136 is operated and causes initialization of the digital signal processor 38 and 39. If there were no start-up errors as determined by decision block 140, task 138 queues instructions to write the appropriate data into the information message queue at function block 142 and the command queue at function block 144. Of course if there is a start-up error, the appropriate information is written to an error message queue at function block 146. The program then returns to decision block 134 through connection A for performing a task in accordance with the particular queue entry. Assuming there was no start-up error, a queued entry is indicated at the command queue entry 148 and at the information message queue entry 150 (See FIG. 4B). If there was a start-up error, an entry would be at the error message queue 153.

Figure 4A:
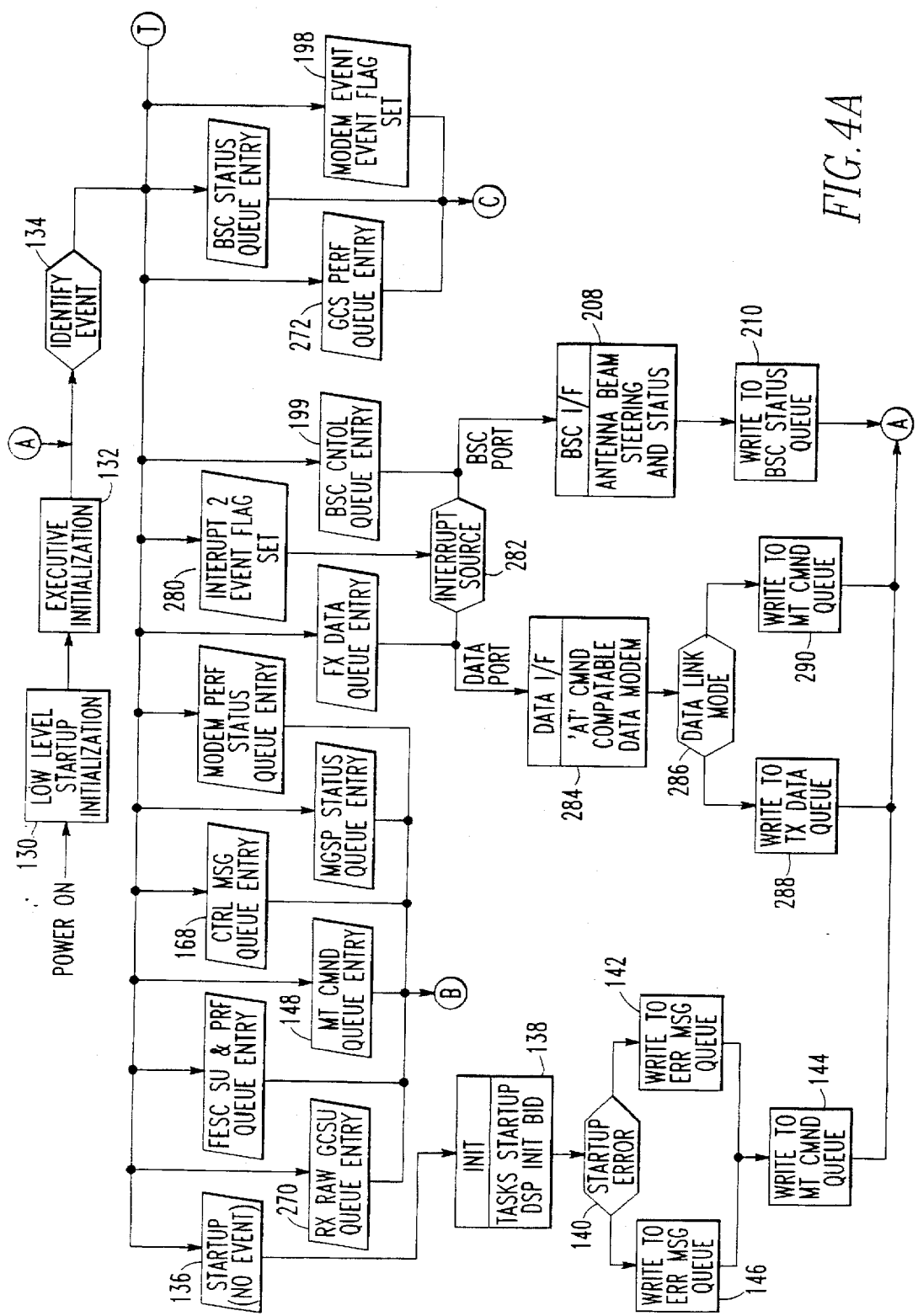
Figure 4B:
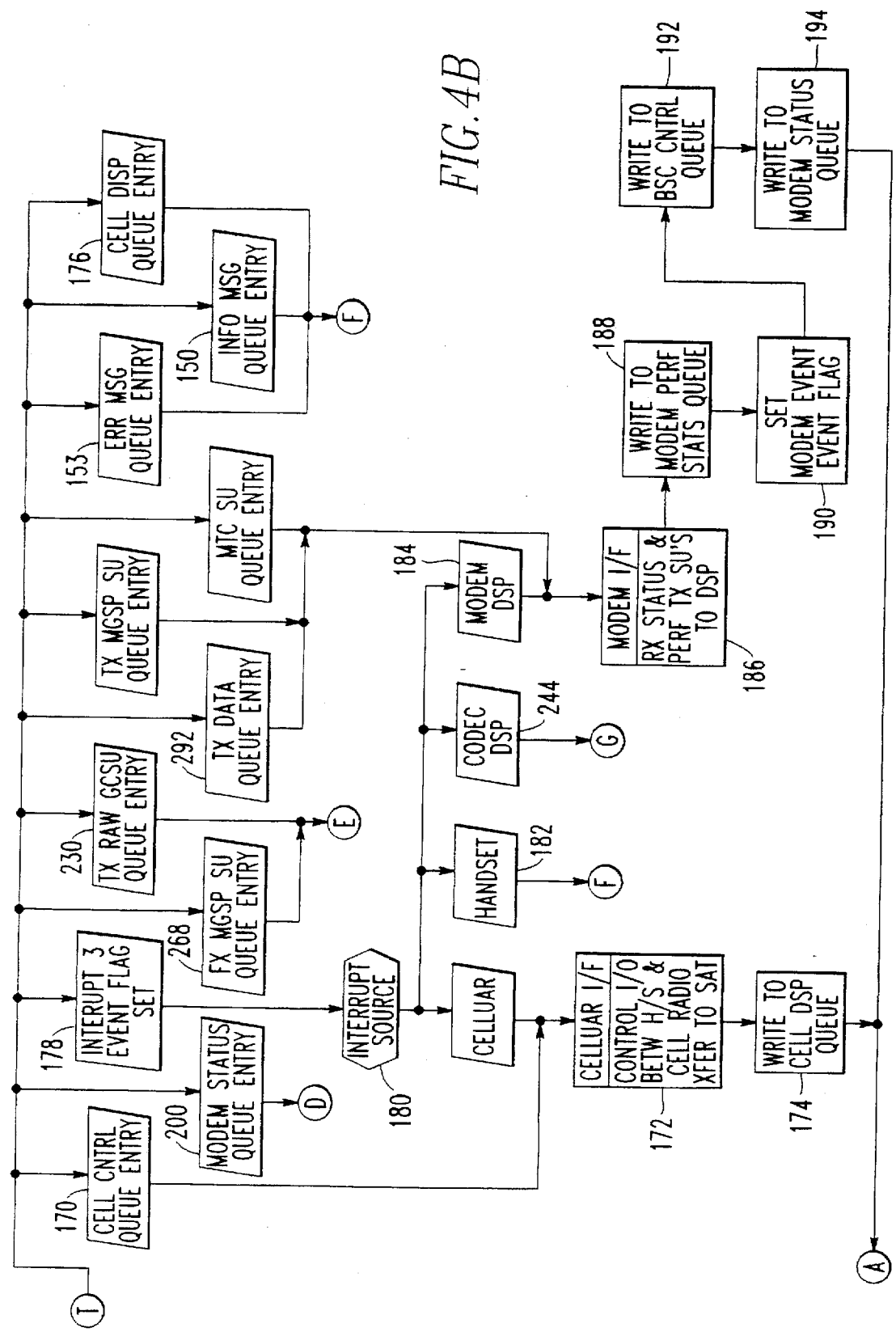
Figure 4C:
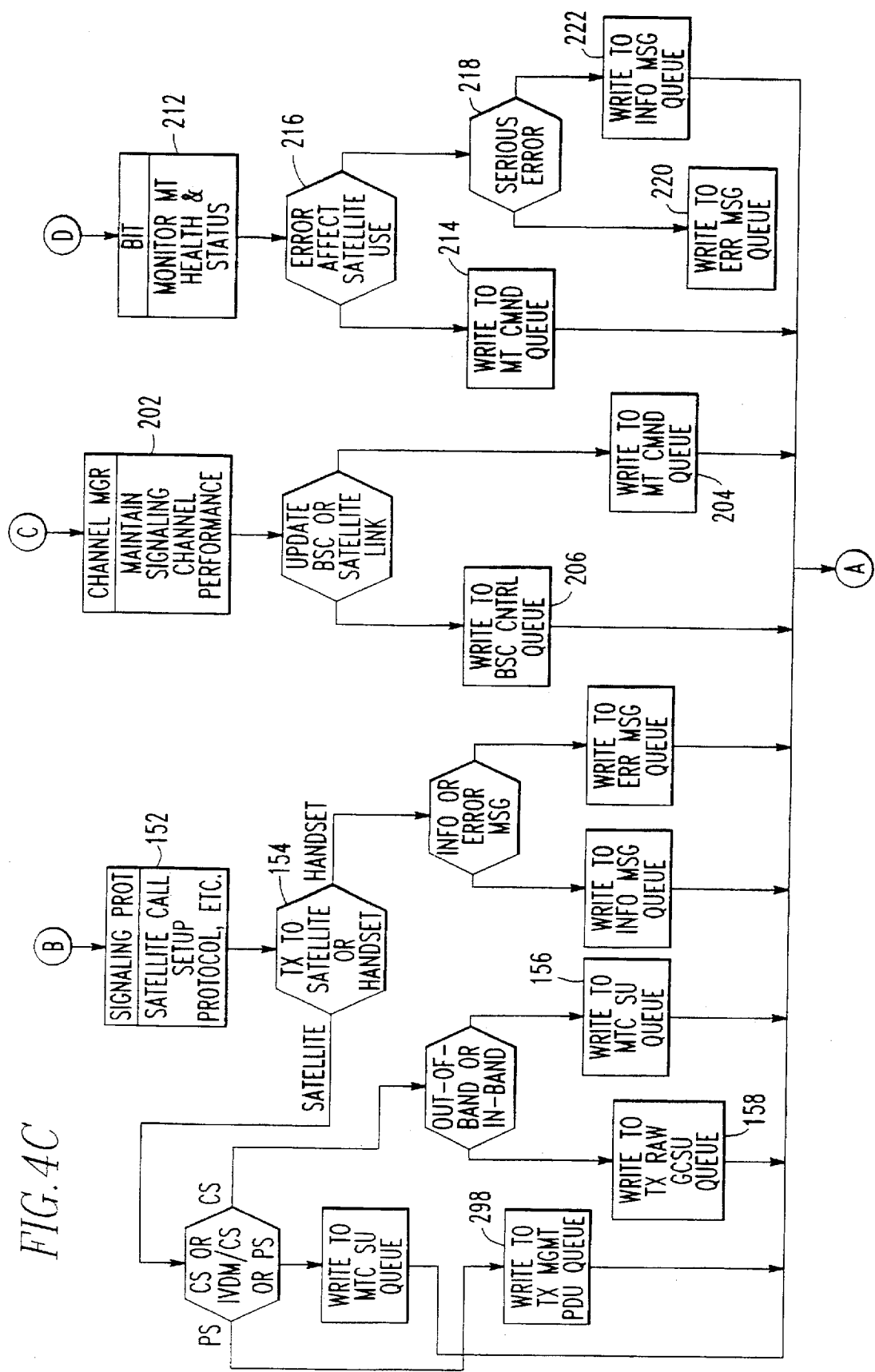

The command queue entry at decision condition block 148 causes the execution of the Signaling Protocol task at the block 152 through connection B at FIG. 4C. The entry of the information-message at block 150 causes execution of task H/S I/F at block 160 (See FIG. 4D) through connection F of FIG. 4D which processes output to the handset display. The Signalling Protocol task at block 152 determines whether the transmission is to the satellite or handset. If the transmission is to the satellite, a decision is made at block 154 as to whether it is out of band or an in band transmission. If it is in band such information is written to the queue of the communication channel signaling unit at function block 156. If the transmission is out of band the instruction is to write such information to the queue of the signaling unit to the group controller GC at the network control center ground station (NCCC) at function block 158.

Figure 4D:
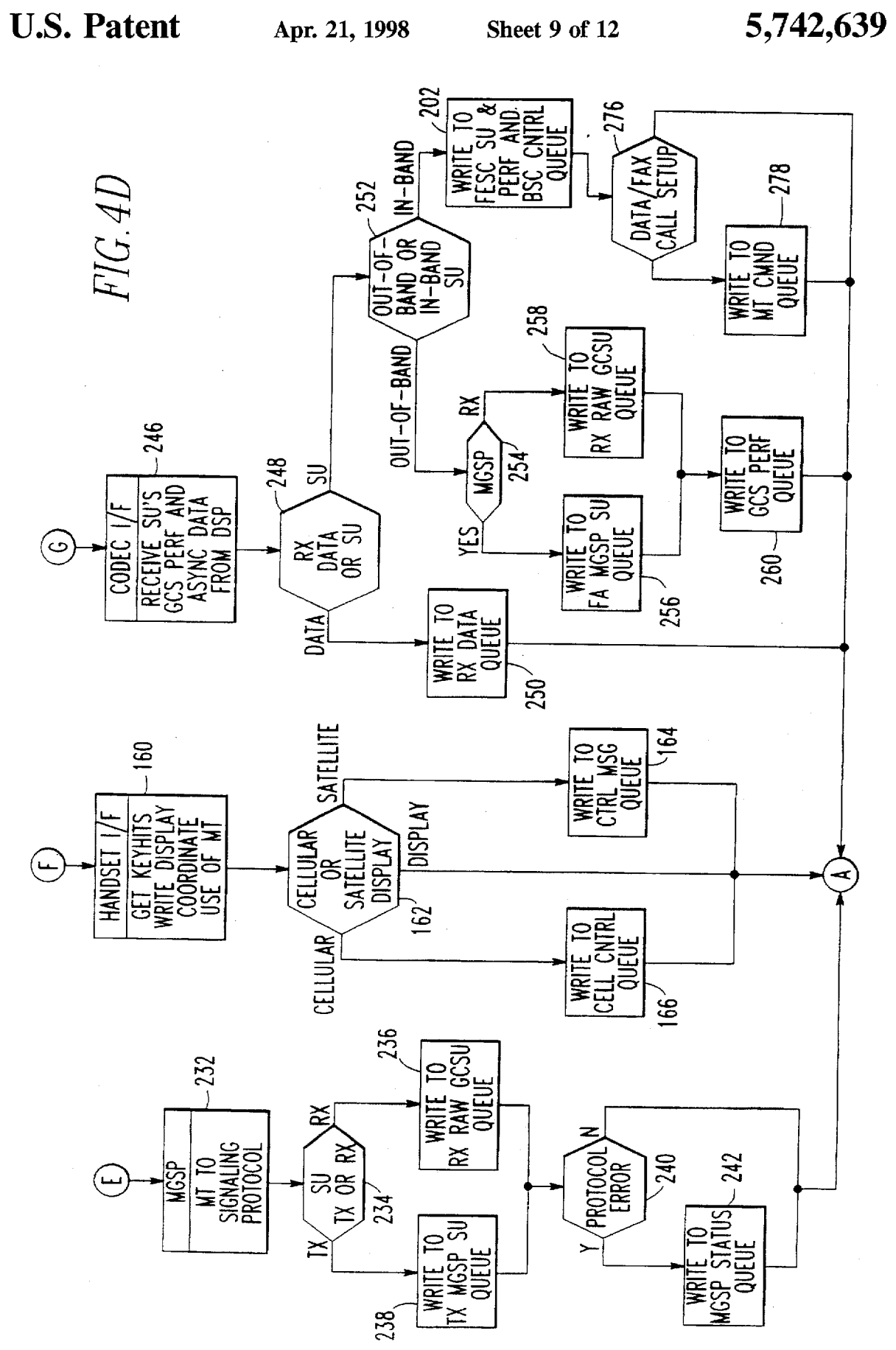

Simultaneously, the instruction from the decision condition block 153 in the case of an error is also routed through connection F to FIG. 4D where control of the handset interface and coordination of peripheral devices is carried out at the task 160. In accordance with the instructions, the program then loops through connection A to complete the startup.

Up to this point in the description of the operation of the control processor 40, the only external event that has occurred is the turning on of the power of the terminal unit. The only tasks that have been called upon to perform are the INIT task at block 138, the Signaling Protocol task at block 152, and the H/S I/F task at block 160.

Assuming that the user initiates a satellite call, an interrupt 3 event flag is set at decision condition block 178. The source of the interrupt is determined at decision block 180. Since the call is being initiated at the terminal unit, the handset decision condition at block 182 is the source. This message is then routed to the function block 160 through the connection F (see FIG. 4D) which then writes to the control message queue which is entered at block 168 of FIG. 4A to activate the task 152 of FIG. 4C. When the interrupt event flag is again set at 178, the interrupt source is modem DSP at decision condition block 184 to activate the MODEM I/F task at block 186. The block 186 causes the writing of information to the queue of the modem performance statistics at block 188, the setting of the modem event flag at 190, the writing of information to BSC control queue at 192 and the modem status queue at 194. Entry of these data are then routed through connection A and the event identification decision block 134.

A setting of the modem event flag at decision condition block 198, activates the Channel Manager task 202 through the connection C (see FIGS. 4A and 4C). The information is then fed to provide instructions to either write to MT command queue at function block 204 for transmission over the satellite link causing performance of the signalling protocol task at block 152, or write to an antenna beam steering control function queue at block 206. Also, the beam steering control queue entry at 199 also causes performance of the BSC I/F task at block 208. The condition at block 200, causes the BIT task at block 212 to perform via connection D. If the built-in test discloses an error which affects the use of the satellite, instructions are written to the command queue at function block 214. If there is no error that affects satellite use as determined by decision block 216 then a decision is made at block 218 as to whether or not the error is serious. If the error is serious, instructions are given to write the results to the error message queue at function block 220. If no serious error exists, instructions are to write the results to the information message queue at function block 222. Entry of the information is made through the connection A to the block 153 (FIG. 4B) in case of an error and the to the information message queue entry at block 150.

If the Signaling Protocol at block 152 is to be transmitted to the satellite, a determination is made as to whether such transmission is in band which is the condition that corresponds to regular voice or data transmission or out of band which corresponds to the transmission of signals. Assuming that it is out of band, instructions are given at 158 to write to the transmit signaling unit to the group controller queue. If the transmission to the satellite is in band, instructions are given to write the information at function block 156 to the communication channel signaling unit queue. The entry from the function block 158 is indicated at 230 of FIG. 4B. This information then causes performance of the MGSP task at block 232 which is connected through connector E of FIG. 4D which is the Signaling Protocol to the group controller at the network control center ground station as previously mentioned. Decision block 234 determines whether such task is a transmission or a receiving task. If it is a receiving task, instructions are given to write the information to the receive group controller signaling unit queue at block 236. If the signaling unit is for a transmission, instructions are given at function block 238 to write the information to the transmit signalling unit queue. Protocol error is checked at decision block 240 and if there is an error instructions are given to write such information to the queue indicating the status of the group controller Signaling Protocol.

Assuming that a call is to be received by the terminal unit, an interrupt occurs at block 178 of FIG. 4B where the source is indicated by decision block 180 to be the digital signal processor 39 at block 244. This results in a task being carried out at block 246 through connection G of FIG. 4D relating to the control of communication and data transfers between the digital signal processor 39 and the control processor 40. The task block 246 involves receiving the SUs from the group controller or feederlink earth station, and the asynchronous data from the DSP 39. A decision is made at block 248 whether or not such receipt is either data or a signaling unit. If it is data, the information is written to the data queue at block 250. If it is a signaling unit, a decision is made as to whether it is out of band or in band at decision block 252. If out of band, a decision is made at block 254 as to whether or not it involves group controller Signaling Protocol; and depending upon the decision either writes to the receive mobile terminal to group controller Signaling Protocol queue at block 256 or the receive signaling unit from the group controller at block 258. Also, instructions are given to write the information to the group controller signaling channel performance queue at function block 260. These instructions are carried out through the connection A back through the identification event block 134 and entered at block 268, 270 and block 272 respectively.

If the information is in band as determined by block 252, instructions are given to write the information to the feeder link earth station communication channel and performance and beam steering control queues at function block 274. If the incoming call is data or a fax call as determined at decision block 276, an instruction is given to write the information to the command queue at function block 278, the entry of which is at carried out at block 148 of FIG. 4A.

In response to a level 2 interrupt from the data port and the antenna beam steering controller, the event flags are set at block 280. The source of the interrupt is determined at decision block 282. If it was caused by data at the interface, the DATA I/F task is performed at block 284. If the interrupt source is from the beam steering controller port, then the BSC I/F task is performed at block 208 and instructions are given to write the information to the beam steering status queue at 210. If the interrupt choice at block 282 is from the data port, a decision is made at 286 as to whether or not the data is actual data or command data. If the information is actual data, instructions are given to write the information to the transmission data queue at block 288. If the information is command, instructions are given at block 290 to write the information to the MT command queue. The data queue is entered at block 292 and the command entry occurs at block 148 of FIG. 4A.

In the event the user wishes to initiate a cellular call, the handset task at 160 is activated in response to the setting of the interrupt 3 event flag at 178 and the indication of the interrupt source is the handset at 182. The cellular selection at 162 causes the instruction to be written to the cell control queue at 166. The cell control queue is entered at 170 and the cellular task is activated at block 172, where coordination between the cellular and satellite system is carried out and includes a control link between the handset and the cellular radio system. The display information is written to the cell display queue at block 174; and the decision condition at block 176 indicates entry of the information in the cellular display queue.

Figure 5A:
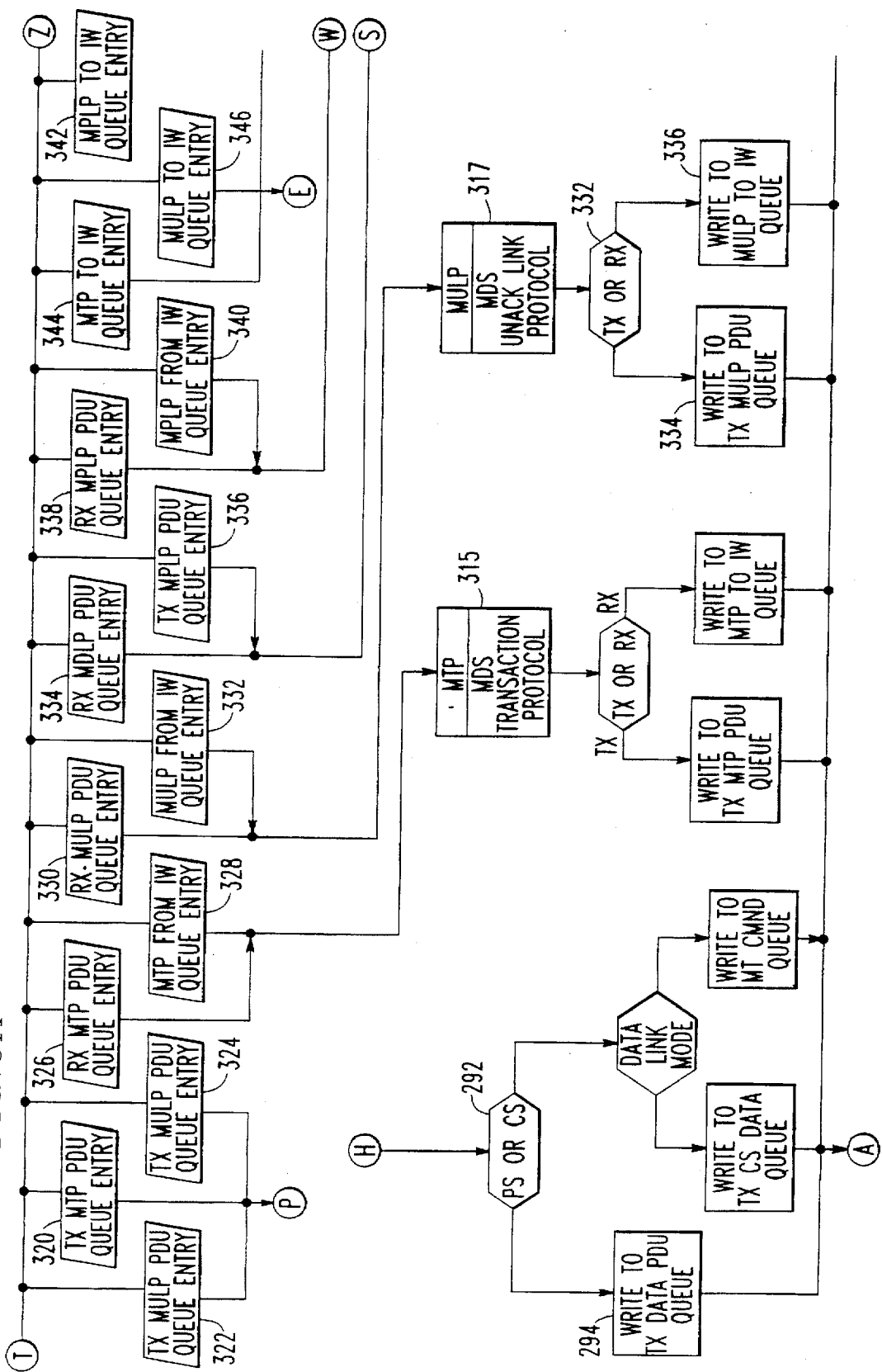
Figure 5B:
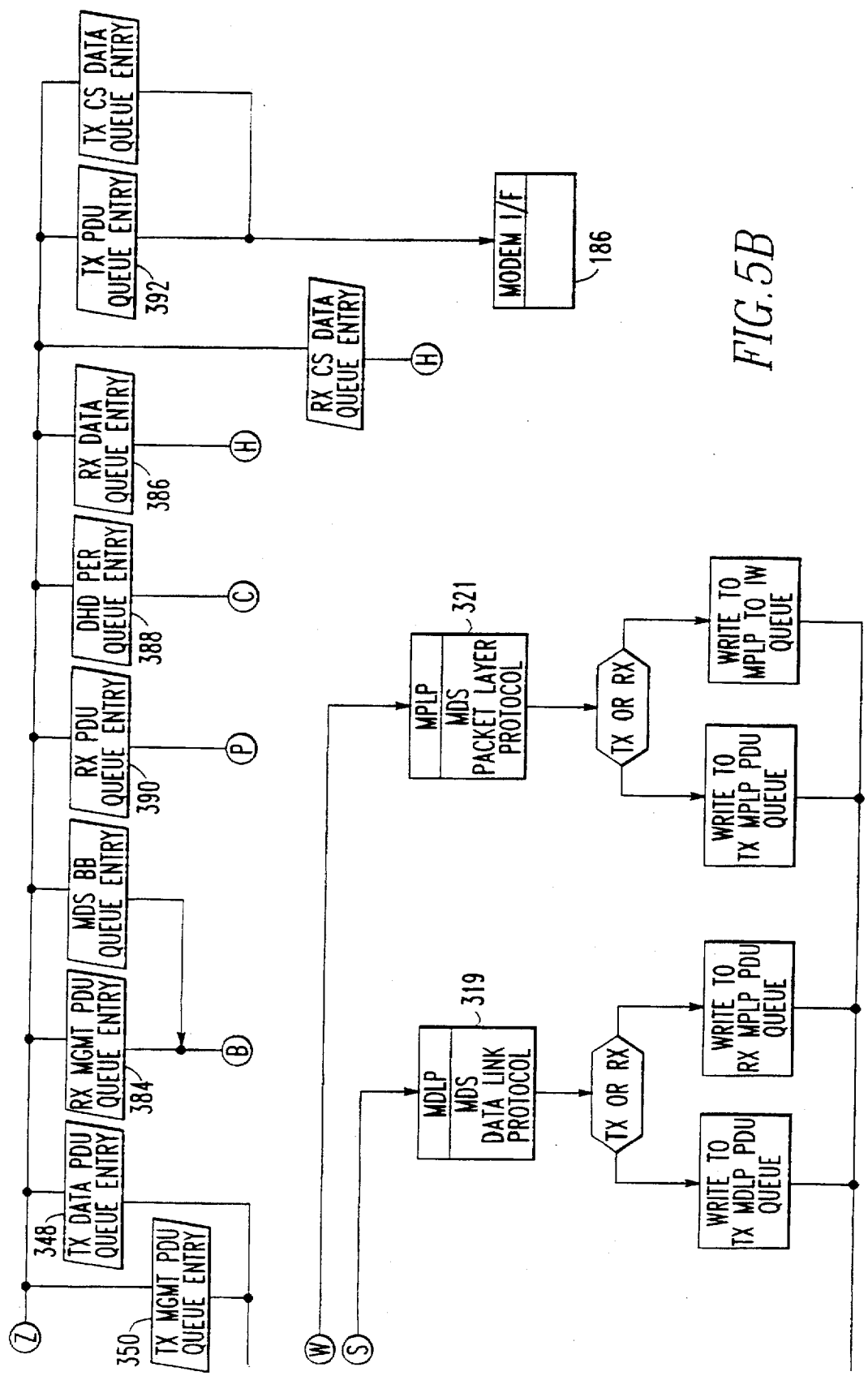

Referring to FIGS. 5A, 5B and 5C, a description of the operation of the mobile terminal will be given in connection with the PS mode previously described in connection with FIG. 2C.

The initialization and start up for the PS mode of the MT is similar to that of the CS mode described in connection with FIGS. 4A through 4D. In the event of an interrupt 2 event flag being set at 280 (see FIG. 4A) and it is determined that the source of the interrupt at 282 is the dataport, then a task is carried out at block 290 through connection H of FIG. 5A which carries out the standard packet communications network protocol, commands compatible with the data modem, and the packet assembly/disassembly functions. In describing the packet switched (PS) mode those tasks and queues that are in addition to the tasks and queues of the circuit switched (CS) mode are described. The tasks that are performed in addition to those performed in the CS mode include the CAC task at block 309, the PS branch of the CODEC I/F at 311, the PS branch of the DATA I/F task at block 284, which writes to the transmit data Protocol Data Unit (PDU) queue, the MTP task at block 315, the MULP task at 317, the MDLP task at 319, the MPLP task at 321, the Interworking task at block 323, and the PS branch of the Signaling Protocol task at the block 152 (See FIG. 4C), which writes to the transmit management protocol data units (PDU).

The CAC task 309 performs upon a transmit MTP PDU queue entry at block 320, a transmit MULP PDU queue entry at block 322, or a transmit MDLP PDU queue entry at block 324. The MTP task 315 performs upon either a receive MTP PDU queue entry at 326 or an MTP from the Interworking task queue entry at 328.

The MULP task at 317 performs upon a receive MULP PDU queue entry at block 330, or the entry of an MULP queue from Interworking at block 332. The MDLP task at block 319 performs upon entry of a receive MDLP PDU queue at block 334 or a transmit MPLP PDU queue at block 336. The task MPLP at block 321 performs upon entry of a receive MPLP PDU queue entry at block 338 or an MPLP from Interworking queue entry at block 340.

The Interworking task at 323 of FIG. 5B performs upon entry of MPLP to Interworking queue at 342, MTP to interworking data queue at 344, MULP to interworking queue at block 346, entry of the transmit data PDU queue at block 348, or entry of the transmit Management queue PDU at 350.

The task CAC at 309 writes to the BSC control and DHD packet error rate queue at 352. If it is in the transmit mode, it writes to the TX PDU queue at 354, and if it is receiving, and is a PDU, the protocol layer is selected at 356. If the layer MTP is selected at 358, the CAC writes to the receive MTP PDU queue at 359. If the protocol layer MULP or MDLP is selected at 360 or 362, respectively, then the task is instructed to write to either the receive MULP PDU queue at 364 or the receive MDLP PDU queue at 366. If the data is a Bulletin Board (BB), then the data is written to the MDS BB queue.

The Interworking task 323 performs protocol conversion and writes to a selected queue corresponding to PDU type from the above described layers. These queues are designated as being from the Interworking tasks at 368, 370, and 372. In addition, if the Management PDU type is selected at 374, or the data PDU is selected at 376, then the task writes the instruction to the management PDU or data PDU queue at 378 and 380 respectively. The PS branch of the CODEC tasks 311 writes to the receive PDU queue at 382.

The MTP, MULP, MDLP, or MPLP protocol layer tasks at 315, 317, 319, and 321 write to a particular queue depending on whether the task is for transmission or receiving. If for transmission, the task writes the data to the corresponding packet data unit or PDU queues. If for receiving, the data is written to the corresponding Interworking queue for MTP, MULP and MPLP and to the receive MPLP, PDU queue for MDLP as shown in FIG. 5C.

The receive management PDU queue entry at 384, the receive data PDU queue entry at 386, the DHD packet error rate queue entry at 388, the receive PDU queue entry 390 and the transmit PDU queue entry at 392 also cause the tasks, Signaling Protocol 152, Data I/F 284, Channel Manager 202, CAC 309, MGSP 232, Modem I/F 186, respectively to perform.

Although there are additional specific operations of the CP 40 that are not specifically verbalized, such operations and functions can be readily realized by the previous description and the FIGS. 4A through 4D and FIGS. 5A and 5B.

It will be apparent to those skilled in the art that various modifications and variations can be made in the apparatus and methods of the present invention without departing from the spirit or scope of the invention. Thus, it is intended that the present invention cover the modifications and variations of this invention provided they come within the scope of the appended claims and their equivalents.

We claim:

1. A mobile terminal apparatus having a transceiver with a user interface, and an antenna for both radiating and collecting RF signals to and from a satellite, the transceiver, comprising:

an RF section coupled to the antenna and a processor board coupled to the RF section and the user interface;
the RF section including
a low noise amplifier and a high power amplifier coupled to the antenna,
a down converter coupled to the low noise amplifier for converting received RF signal waveforms to IF waveforms,
an up converter coupled to the high power amplifier for converting modulated analog waveforms from an IF to an RF frequency for amplification and transmission to the antenna;
a first analog to digital converter having an input connected to the down converter, for converting the analog IF waveform to a series of digital samples;
a first digital to analog converter connected to the up converter for converting modulated digital samples from the processor board to an IF frequency;
the processor board including
a signal processor including a digitally implemented demodulator function, a digitally implemented modulator function, a digitally implemented receive framing function coupled to the demodulator, a digitally implemented transmit framing function coupled to the modulator, and a digitally implemented coding function and decoding function coupled to the transmit and receive framing functions, respectively; and
a control processor coupled to the signal processor for controlling the digitally implemented functions;
wherein the receive framing function includes means for using unique words to frame transmitted informational data and to define data synchronization points.

2. The apparatus of claim 1 wherein the signal processor comprises a first signal processor unit that includes the demodulator function, the receive framing function, the modulator function, and the transmit framing function; and a second signal processor unit including the decoding and encoding function.

3. The apparatus of claim 1 wherein the digital signal processor comprises means for operating in the voice mode, means for operating in the facsimile and data modes, and means for operating in the signalling and packet switch modes.

4. A mobile terminal apparatus having a transceiver with a user interface, and an antenna for both radiating and collecting RF signals to and from a satellite, the transceiver, comprising:

an RF section coupled to the antenna and a processor board coupled to the RF section and the user interface;

the RF section including a low noise amplifier and a high power amplifier coupled to the antenna, a down converter coupled to the low noise amplifier for converting received RF signal waveforms to IF waveforms, an up converter coupled to the high power amplifier for converting modulated analog waveforms from an IF to an RF frequency for amplification and transmission to the antenna;

a first analog to digital converter having an input connected to the down converter, for converting the analog IF waveform to a series of digital samples;

a first digital to analog converter connected to the up converter for converting modulated digital samples from the processor board to an IF frequency;

the processor board including a signal processor including a digitally implemented demodulator function, a digitally implemented modulator function, a digitally implemented receive framing function coupled to the demodulator, a digitally implemented transmit framing function coupled to the modulator, and a digitally implemented coding function and decoding function coupled to the transmit and receive framing functions, respectively;

a control processor coupled to the signal processor for controlling the digitally implemented functions;

wherein the transmit framing function comprises voice activation and deactivation logic for turning on and off the transmitted carrier when the user is talking or silent; and means for maintaining the satellite frame timing during both talking and silence.

5. A mobile terminal apparatus having a transceiver with a user interface, and an antenna for both radiating and collecting RF signals to and from a satellite, the transceiver, comprising:

an RF section coupled to the antenna and a processor board coupled to the RF section and the user interface;

the RF section including a low noise amplifier and a high power amplifier coupled to the antenna, a down converter coupled to the low noise amplifier for converting received RF signal waveforms to IF waveforms, an up converter coupled to the high power amplifier for converting modulated analog waveforms from an IF to an RF frequency for amplification and transmission to the antenna;

a first analog to digital converter having an input connected to the down converter, for converting the analog IF waveform to a series of digital samples;

a first digital to analog converter connected to the up converter for converting modulated digital samples from the processor board to an IF frequency;

the processor board including a signal processor including a digitally implemented demodulator function, a digitally implemented modulator function, a digitally implemented receive framing function coupled to the demodulator, a digitally implemented transmit framing function coupled to the modulator, and a digitally implemented coding function and decoding function coupled to the transmit and receive framing functions, respectively;

a control processor coupled to the signal processor for controlling the digitally implemented functions;

wherein the transmit framing comprises means for reordering in time a time ordered series of transmit bytes or a packet of data; and means for the forward error correction of data in accordance with a constraint length convolutional coding of either one-half, one-third, or three-quarters coding.

6. In a mobile terminal apparatus for a satellite communications network where the mobile terminal unit has a transceiver with an RF section and a digital signal processing section, a method of processing RF signals received by the transceiver comprising down converting the received RF signals to an IF frequency;

sampling digitally the IF frequency;

demodulating the digital samples;

framing the digital samples in accordance with a unique word;

decoding the framed samples;

feeding the decoded frames to a digital to analog converter;

operating a user device in accordance with the converted signals;

wherein the step of framing the digital samples comprises the substeps of using the unique words as data synchronization points; recovering informational data embedded in a satellite frame format; maintaining real time frame timing in accordance with the satellite frame format; descrambling randomized data; and recovering the original byte order of interleaved data bytes.

7. In a mobile terminal apparatus for a satellite communications network where the mobile terminal unit has a transceiver with an RF section and a digital signal processing section, a method of processing RE signals received by the transceiver comprising down converting the received RF signals to an IF frequency;

sampling digitally the IF frequency;

demodulating the digital samples;

framing the digital samples in accordance with a unique word;

decoding the framed samples; feeding the decoded frames to a digital to analog converter; and operating a user device in accordance with the converted signals;

wherein the step of demodulating comprises the substeps of mixing a sampled real IF signal to form an IQ baseband signal, performing fast fourier transforms to identify the signal carrier frequency, tracking the identified carrier frequency;

tracking the timing of incoming signals to be demodulated;

detecting symbols by matched filtering;

differentially encoding the detected symbols;

and computing the signals strength of the demodulated signals.

8. In a mobile terminal apparatus for a satellite communications network where the mobile terminal unit has a transceiver with an RF section and a digital signal processing section, a method of processing RF signals received the transceiver comprising down converting the received RF signals to an IF frequency;

sampling digitally the IF frequency;

demodulating the digital samples;

framing the digital samples in accordance with a unique word;

decoding the framed samples; feeding the decoded frames to a digital to analog converter;

operating a user device in accordance with the converted signals;

modulating an encoded digital data stream by quaternary phase shift keying the digital transmit data stream to produce an ideal IQ modulated baseband signal; and performing a 60% root cosine filtering of the quaternary phase shift keying modulated baseband signal.

\* \* \* \* \*